United States Patent [19]

Vaux

[11] Patent Number: 5,013,029
[45] Date of Patent: May 7, 1991

[54] SHOCK-ATTENUATING SEAMLESS SURFACE SYSTEM FOR USE ON VERTICAL TAKEOFF AND LANDING ZONES

[76] Inventor: Thomas M. Vaux, 437 Tenth Ave. West, Kirkland, Wash. 98033

[21] Appl. No.: 377,415

[22] Filed: Jul. 10, 1989

Related U.S. Application Data

[63] Continuation-in-part of Ser. No. 152,817, Feb. 5, 1988, Pat. No. 4,846,457, which is a continuation-in-part of Ser. No. 767,718, Apr. 23, 1986, Pat. No. 4,727,697, which is a continuation of Ser. No. 364,811, Apr. 2, 1982, abandoned.

[51] Int. Cl.$^5$ .............................................. A63G 71/02
[52] U.S. Cl. .......................................... 272/3; 52/177; 404/32; 404/43
[58] Field of Search ............... 52/177; 5/443, 444, 5/448, 449, 465, 480, 481, 417–420; 272/3–5, 109; 273/193 A, 193 R; 404/32–37, 43

[56] References Cited

U.S. PATENT DOCUMENTS

| | | | |
|---|---|---|---|
| 957,387 | 5/1910 | Stedman | 404/32 |
| 2,920,846 | 1/1960 | Lingafelter | 244/114 |
| 2,999,431 | 9/1961 | Mitchell | 404/32 |
| 3,251,076 | 5/1966 | Burke | 272/109 |
| 3,846,945 | 11/1974 | Roby | 52/177 |
| 4,557,475 | 12/1985 | Donovan | 272/3 |
| 4,572,700 | 2/1986 | Mantarro et al. | 404/35 |

FOREIGN PATENT DOCUMENTS

| | | | |
|---|---|---|---|
| 58825 | 9/1982 | European Pat. Off. | 272/3 |
| 92837 | 11/1983 | European Pat. Off. | 272/3 |

Primary Examiner—Richard E. Chilcot, Jr.
Attorney, Agent, or Firm—Joseph Scafetta, Jr.

[57] ABSTRACT

Shock-attenuating seamless surface systems, for use on vertical takeoff and landing zones, can be installed on a base or installed in a recess in the base such that an integrated installation is obtained.

All systems have a surface layer with a bottom and outer edges; ribs extending from the bottom of the surface layer for defining an array of air-filled cells affixed to the bottom of the surface layer; and a first layer of sealer and aggregate spread over the surface layer, the outer edges, and the base immediate to surface system.

More complex systems may include one or more of the following: a plurality of median ribs extending a shorter distance from the bottom of the surface layer than the defining ribs in order to give added support against a strong blow striking the surface layer and the array of air-filled cells affixed thereto; a void area left in place of at least one median rib in order to facilitate cutting through the surface layer; a second layer of sealer spread under the array of air-filled cells and above the base in order to prevent the escape of air therefrom upon impact thereto and also for holding the array of air-filled cells in a substantially vertical orientation with respect to the base; a sloping outer edge surrounding all sides to help prevent tripping and facilitate access by handicapped person; and a beveled outer edge surrounding all sides for facilitating attachment to the base.

38 Claims, 5 Drawing Sheets

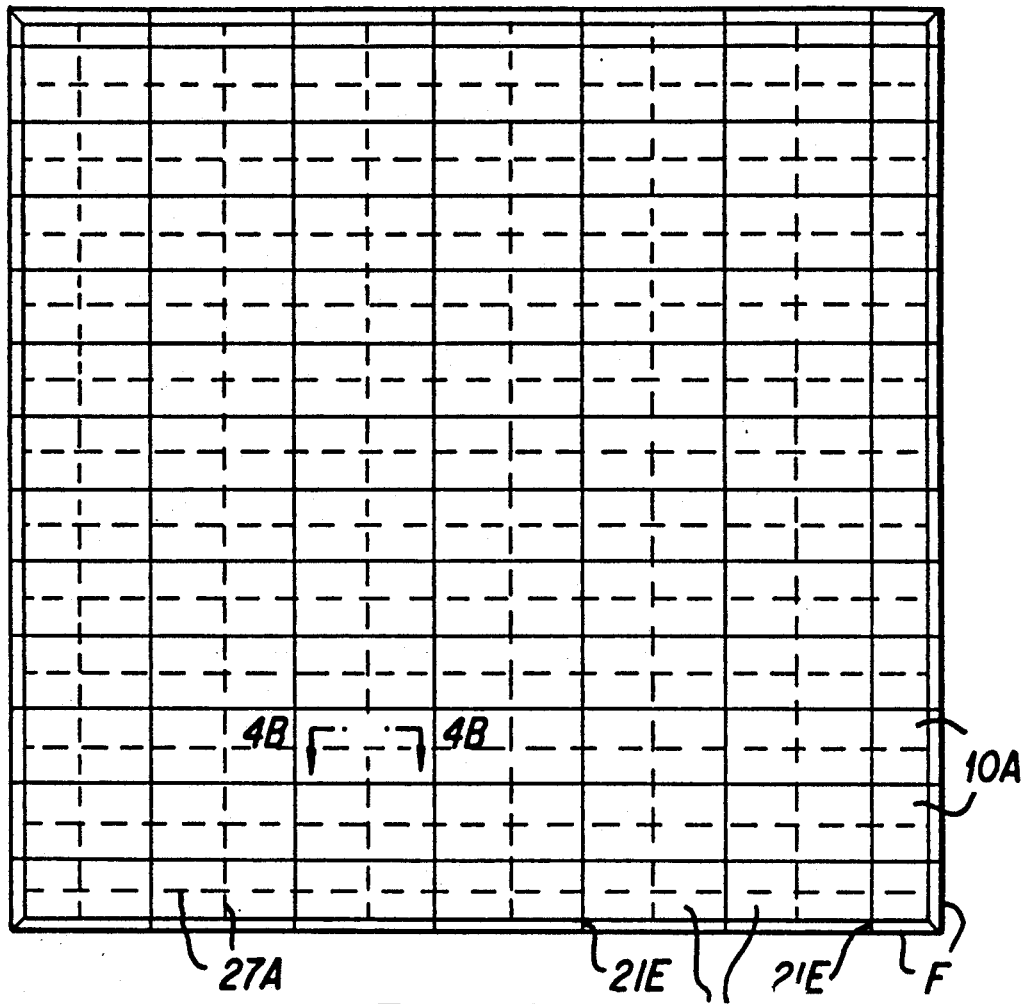
FIG. 4A
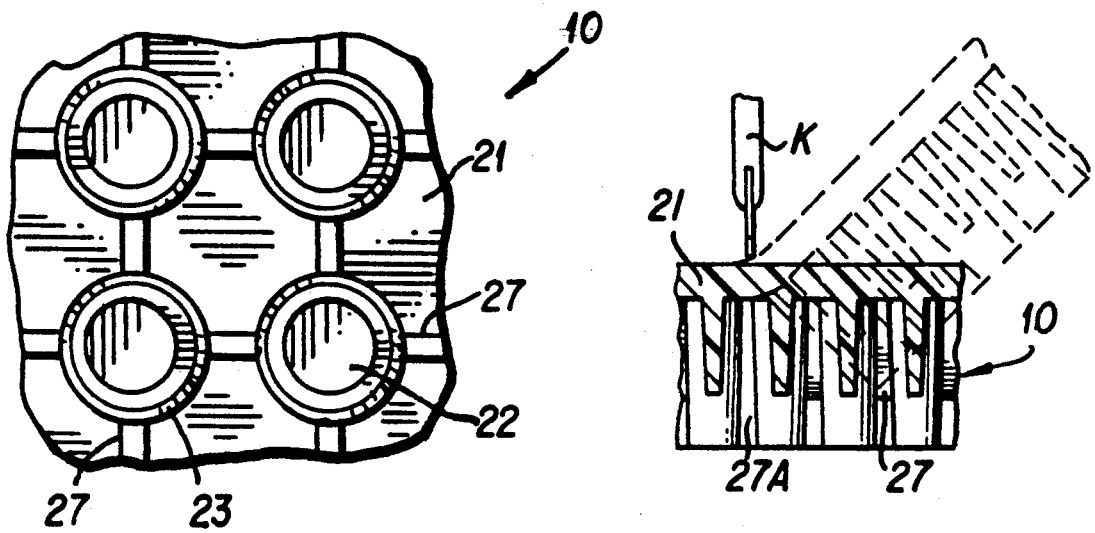
FIG. 4C
FIG. 4B

SHOCK-ATTENUATING SEAMLESS SURFACE SYSTEM FOR USE ON VERTICAL TAKEOFF AND LANDING ZONES

CROSS-REFERENCE TO RELATED APPLICATIONS

This application is a continuation-in-part of Application Ser. No. 07/152,817, filed Feb. 5, 1988, now issued as U.S. Pat. No. 4,846,457 on July 11, 1989, which is a continuation-in-part (CIP) of U.S. Pat. Application Ser. 06/767,718, filed Apr. 23, 1986, now issued as U.S. Pat. No. 4,727,697 on Mar. 1, 1988, which is a continuation of U.S. Patent Application Ser. No. 06/364,811, filed Apr. 2, 1982, now abandoned.

BACKGROUND OF THE INVENTION

1. Field of the Invention

The present invention relates generally to static structures, particularly traffic-carrying surfaces, such as helicopter landing pads.

2. Description of the Related Art:

Helipads used for both civilian and military applications have usually consisted of an asphalt or concrete substrate that is coated with urethanes of various colors to form a predetermined pattern. The urethane coatings are generally applied just 8 mils (8/1000 of an inch=0.203 millimeters) thick; consequently, they provide no significant benefit other than clearly marking a landing zone.

With a desire for a more permanent and consistent surface, nonloose fill surfaces in the nature of processed particles bonded together in some fashion were developed to be installed over hard surfaces, such as concrete and asphalt. Nonloose fill surfaces, which are generally referred to as synthetics, can be divided into two main categories: systems with seams and systems without seams. Examples of systems with seams or so-called nonseamless systems are shown in U.S. Pat. No. 4,557,457 to Donovan, U.S. Pat. No. 3,846,945 to Roby, U.S. Pat. No. 3,251,076 to Burke, U.S. Patent No. 2,999,431 to Mitchell, and U.S. Pat. No. 957,387 to Stedman.

Both nonseamless and seamless surfacing systems have an attenuating element and a surface layer. This surface layer can be either installed in the field or integrated at the time of manufacture. However, the seamless systems have a texture coat of sealer and aggregate applied over the surface layer to form a monolithic arrangement.

Seamless surfacing systems are becoming the more desirable of the synthetic systems because insects and rodents cannot enter and nest in them, nor can dirt and debris collect or lodge in any seams. Also, properly designed and installed seamless systems do not absorb toxins associated with debris or contaminated air.

An additional benefit of seamless surfacing systems is that water is not allowed to enter into the system. Water, when introduced into the system, can cause structural deterioration, and delamination of the surface system from its subbase, and can cause the seamless surface system to freeze much more quickly and intensely in conditions below 0.0 degrees Celsius.

SUMMARY OF THE INVENTION:

A seamless protective surfacing system for vertical takeoff and landing aircraft (VTOL), such as helicopters, comprises of an integrated helipad which will significantly attenuate the forces associated with the shock load that the aircraft experiences on touchdown. The protective surface system will significantly attenuate the accelerations experienced by the helicopter as it is warming up, idling, or idling down; and the protective surface system makes an excellent surface for handling and loading munitions, since it reduces the risk of accidental detonation or damage to the munitions in the case of material mishandling. The protective surface system will not allow direct entry, absorption, or retention of any significant amount of solids, liquids, or contaminated air that come in contact with the surface system, nor any toxins associated with those solids, liquids, and contaminated air.

Helicopter pilots generally attempt to stabilize the aircraft at a height of four to ten feet above the ground, and orient the helicopter at a particular angle to the ground. The helicopter's landing orientation (height and angle to the ground) during stabilization is determined by various factors, such as wind speed, conditions of rain or snow, and necessity to land. In optimum conditions, the helicopter pilot should be able to correctly orient and stabilize the aircraft prior to landing; however, due to mechanical failure, pilot error, or inclement weather, the helicopter can be brought down at an incorrect angle to the ground, or brought down so quickly that the shock load on impact exceeds substantially the shock attenuating capabilities, if available, of the helicopter's landing gear (i.e. skids or pneumatic tires) and suspension system.

Thus it is an object of the present invention to provide a seamless surfacing system for use as a helipad to significantly attenuate a shock load in excess of the capabilities of the aircraft's landing gear and suspension system, due to mechanical failure, pilot error, or conditions of inclement weather.

In the case of a helicopter landing at an incorrect angle to the ground, the aircraft may gyrate in such a manner that the helicopter tips over, and consequently its rotor blades or other mechanical parts strike the ground producing sparks. If aviation fuel has spilled from the fuel tanks, the sparks from the rotor blades or other mechanical parts may ignite a fire. A fire of this type and intensity would put the aircraft and the personnel aboard in extreme danger.

Thus it is also an object of this invention to provide a seamless surfacing system for use as a helipad that will attenuate a blow to the surface from the rotor blades or another mechanical part, such that the possibility of sparks resulting from the blow to the surface will be greatly reduced or eliminated.

A helicopter, when warming up, idling, or idling down, accelerates significantly with respect to the ground (i.e. asphalt, concrete, or 8 mils of urethane over concrete or asphalt). The accelerations that the helicopter experiences generally result in increased maintenance costs and a shorter product life span. If the damage resulting from accelerations to the helicopter at certain frequencies, while idling, is not repaired, then the VTOL aircraft would have a predisposition to mechanical failure while in flight. The noise created by the helicopter's accelerations can cause loss of hearing, fatigue, irritability, and disorientation to the persons aboard the aircraft.

Therefore another important objective of the present invention is to provide a seamless surfacing system that will substantially reduce the accelerations of the helicopter when warming up, idling, or idling down.

Traffic-carrying surfaces for areas where munitions are handled have generally been metallic or concrete because heavy equipment, such as motorized carts and utility vehicles for moving materials, were required to pass over them. Although metal and concrete make good transportation surfaces and are easy to clean, they provide no attenuating protection for munitions, mechanical tools, or mechanical parts that may be dropped.

Thus it is an object of the present invention to provide a seamless surfacing system for use under munitions handling areas, and areas where mechanical tools and parts are handled that will substantially protect against damage arising from the accidental dropping or mishandling of munitions, mechanical tools, and mechanical parts.

Seamless surface systems vary in structural design, and the quality and compatibility of their component parts. If a seamless surface system is improperly engineered or utilizes incompatible component parts, the shrinking, cracking, delamination, and structural deterioration that occur as a result of exposure to the sun's ultra-violet rays will permit entry and retention of water, dirt, debris, and toxins from contaminated air. As the VTOL aircraft is landing, a toxic dust that forms by combining solids, liquids, and toxins within the surface system is uplifted, then blown towards, and finally inhaled by both the persons awaiting the touchdown of the helicopter, and later by the personnel exiting the aircraft.

It is an object of the present invention to provide a properly engineered seamless surface system comprised of compatible component parts of appropriate quality, such that when subjected to all types of atmospheric conditions, the surface system will not allow any significant entry or retention of water, dirt, debris, or toxins from polluted air.

Laboratory and field tests that measure the shock attenuating properties of the seamless surface system will have to be developed or adapted from an existing standardized test methodology. The laboratory tests would require mounting accelerometers at significant stress points within the VTOL aircraft, and performing impact testing at various impact velocities and angles to the ground. The data obtained from the laboratory impact testing will determine the exact structural design and installation techniques to produce an optimal seamless surface system. The field testing would consist of using portable versions of the laboratory test methodologies, and testing the surface system at specific intervals of time, within a predetermined product life span of five to ten years. Field test data combined with maintenance and injury records of several installed surface systems, each in a substantially different atmospheric environment (e.g. Seattle, Wash.; Los Angeles, Calif.), will generate the data necessary to substantiate the cost effectiveness of the surface systems with respect to reduced maintenance costs, extended life span, and reduction in both incidence and severity of injuries to the personnel aboard the aircraft and those who maintain it.

Thus it is an extremely important object of the present invention to provide a seamless surface system such that when impact tested in the laboratory, the data generated is reproducible in the field; and when the laboratory and field test data are factored in with aircraft maintenance and human injury records, the cost effectiveness of the seamless surface system is justifiable.

How these objects and other advantages of the present invention are obtained will become more readily understood from the following brief description of the drawings and the subsequent detailed description of the preferred embodiments.

BRIEF DESCRIPTION OF THE DRAWINGS:

FIG. 4A is a top plan view of a plurality of contiguous mats of present invention.

FIG. 4B is a cross-sectional view taken along line 4B-4B in FIG. 4A of the present invention.

FIG. 4C is a bottom plan view of a mat of the present invention.

DETAILED DESCRIPTION OF THE PREFERRED EMBODIMENTS

Figure 1:
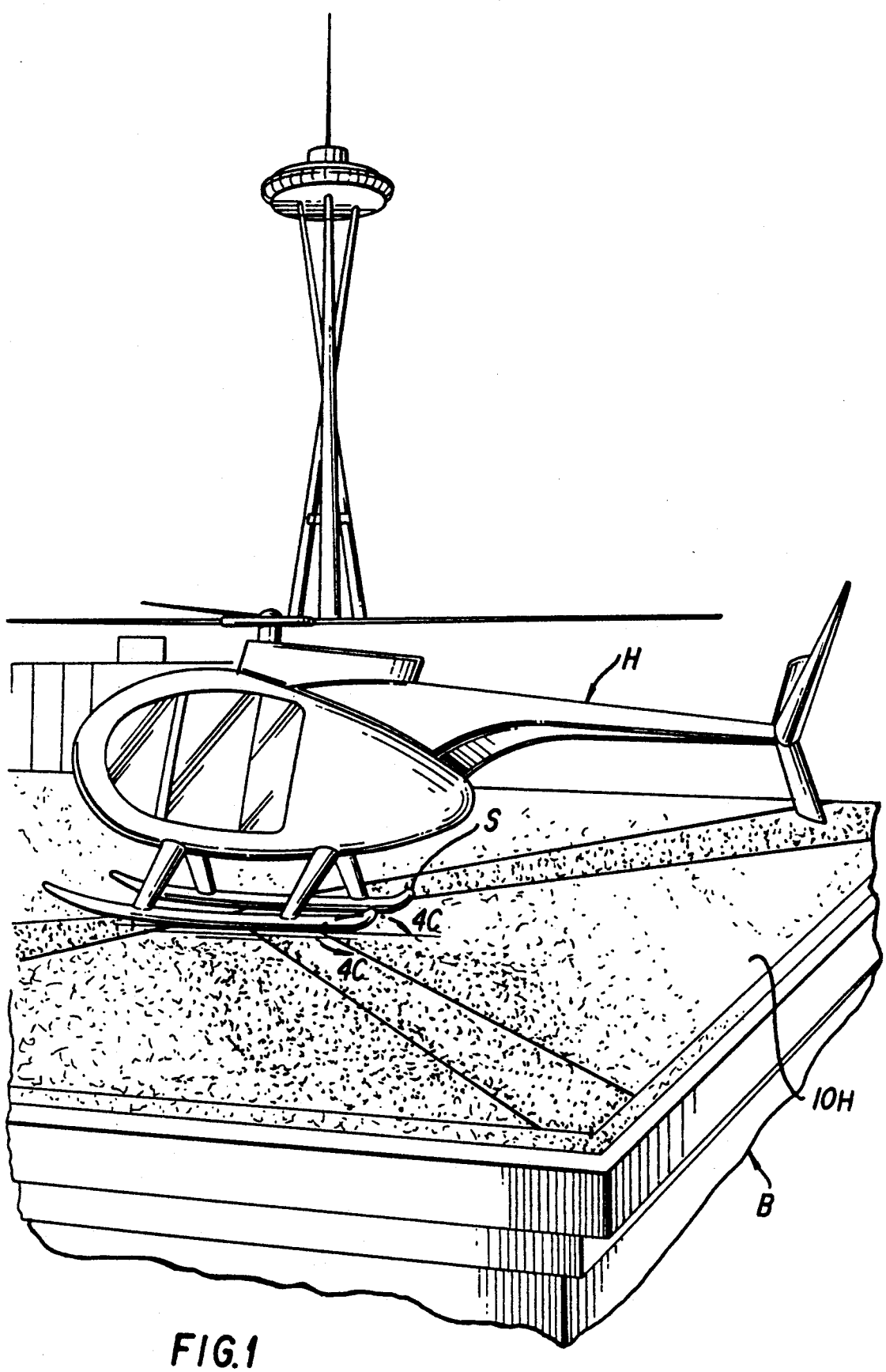
FIG. 1 is a perspective view of a helicopter H on a helipad 10H of the present invention.

In FIG. 1, a first embodiment of the present invention shows a helicopter H with skids S resting on a helipad 10H which has been installed on top of a building B.

Figure 2:
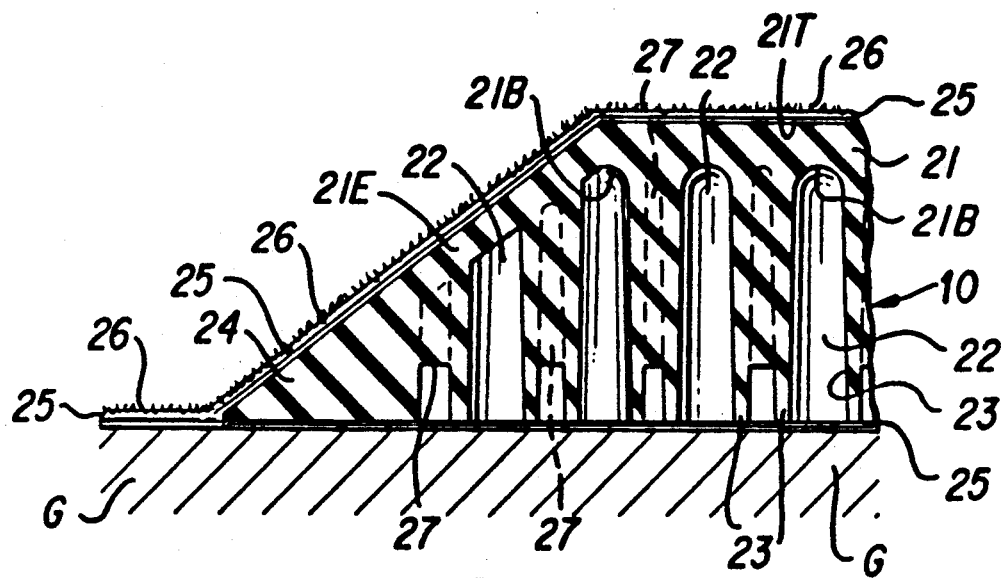
FIG. 2 is a cross-sectional view of a mat of the present invention installed on the ground.

In FIG. 2, a second embodiment of the present invention shows an impact-absorbing safety mat 10 placed on the ground G which may be an asphalt or concrete base. The mat 10 has a surface layer 21 with a bottom 21B and a beveled outer edge 21E. A honeycombed array of air-filled cells 22 depend from the bottom 21B of the surface layer 21. Ribs 23 extend from the bottom 21B of the surface layer 21 and define the honeycombed array of air-filled cells 22. A sloping outer edge 24 surrounds all sides of the mat 10, which helps to prevent tripping and facilitates access for the handicapped. The sealer 25 and the aggregate 26 are spread over a top 21T of the surface layer 21, the sloping outer edge 24, and the ground G immediately adjacent to the mat 10, so that the sealer 25 prevents the sloping outer edge 24 from lifting up and warping, thus maintaining the integrity of the installed system. A second layer of the sealer 25 is also spread under the array of air-filled cells 22 so that both air and moisture are prevented from entering into and escaping from the air-filled cells 22. This second bottom layer of the sealer 25 also helps to hold the array of air-filled cells 22 in a substantially vertical orientation with respect to the ground G. Median ribs 27 extend a shorter distance from the bottom 21B of the surface layer 21 than the defining ribs 23 and give added support to the surface layer 21 against a strong blow striking the array of air-filled cells 22.

Figure 3:
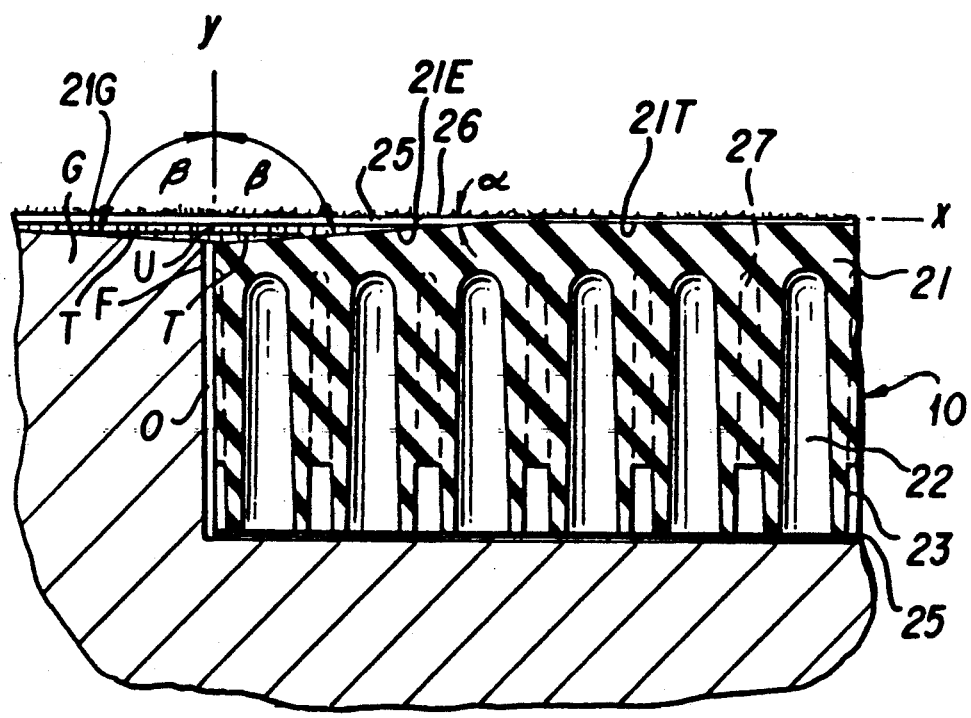
FIG. 3 is a cross-sectional view of a mat of the present invention recessed in the ground.

In FIG. 3, a third embodiment of the present invention shows an impact-absorbing safety mat 10 is recessed in the ground G which again may be a concrete or asphalt base. The structure of the third embodiment is identical to the structure of the second embodiment described in FIG. 2 except that the third embodiment omits the sloping outer edge 24. Also, the surface layer 21 has a modified outer edge 21E which is a bevel or chamfer. A bevel is defined by Webster's New Collegiate Dictionary (1981) at page 105 as "the angle that one surface or line makes with another when they are not at right angles". In this third embodiment, the preferred gradation of an angle β (beta) formed between the vertical y-axis extending along a face of the recess in the ground G and the beveled outer edge 21E is 83.75°. This angle β is made by extending the outer edge 21E back two inches along the x-axis and dropping the outer edge 21E down one-eighth inch along the y-axis so that the angle β has a 16:1 ratio or a complementary angle α (alpha) of 6.25°. An opening O left between the beveled outer edge 21E and a beveled outer edge 21G, which is immediately adjacent the face F of the recess in the ground G, is covered over with a fiberglass mesh tape T which is, in turn, penetrated by a urethane paste U comprised of urethane and fine mesh rubber granules that enter holes in the tape T, thus encapsulating the tape T. The urethane paste U is built up until it fills the bevel or chamfer forming the angles β between adjacent beveled outer edges 21E and 21G, so that the tape T and the urethane paste U secure the mat 10 to the ground G. The top of the urethane paste U, which encapsulates the tape T, and the top 21T of the surface layer 21 are now flush with the ground G. Then the top 21T of the surface layer 21, the top of the urethane paste U, which encapsulates tape T, and the top 21T of the surface layer 21 are now flush with the ground G. Then the top 21T of the surface layer 21, the top of the urethane paste U, which encapsulates tape T, and the ground G, which is immediately adjacent the urethane paste U, are covered over by the sealer 25 and the aggregate 26. Thus, the mat 10 becomes seamless with the ground G to form an integrated installation therewith.

In FIG. 4A, a plurality of mats 10 are shown to be laid in a predetermined pattern. In this top view of FIG. 4A, the mats 10 are adjacent to each other. However, one layer of mats 10 may be placed on top of another layer in order to double the impact-absorbing ability of the integrated installation. The mats 10 are shown in FIG. 3 where the sealer 25 and the aggregate 26 are spread thereover. FIG. 4A also shows the beveled outer edges 21E in solid lines, along which each mat 10 is joined, in a manner to be described with regard to FIG. 6B, to an adjacent identical mat 10. For the sake of simplicity, the bevel or chamfer on all four outer edges 21E is not shown, but is illustrated only along the face F of the recess seen in FIG. 3. In FIG. 4A, each mat 10 is preferably four feet long and two feet wide, as can be seen by viewing the solid lines which are drawn in a pattern showing the length of each mat 10 to be twice the width. Each dashed line shown in FIG. 4A represents a void area 27A where a median rib 27 is omitted during the manufacture of each mat 10.

In FIG. 4B, the purpose of the void area 27A is shown to allow an installer to sever a selected mat 10 in half through the surface layer 21 with a cutting knife K so that each 2' by 4' mat may become either a 2' by 2' mat or a 1' by 4' mat, depending upon whether the cut is made through the middle thereof widthwise or lengthwise, respectively. The provision of void areas 27A in mat 10 is exemplified by returning briefly to FIG. 4A. In FIG. 4A along the right hand side thereof, it may be seen from the solid lines that a plurality of mats 10A have been cut as 2' by 2' mats by cutting 2' by 4' mats 10 widthwise. Thus, surface configurations having odd footage measurements may be covered by severing a mat lengthwise into two 1' by 4' sections.

In FIG. 4C, the underside of the surface layer 21 is shown with the bottoms of four selected adjacent air-filled cells 22. The cylindrical ribs 23 defining the array of air-filled cells 22 extend from the bottom of the surface layer 21 and have slight tapers. Each cell 22 has one median rib 27 at the so-called 3, 6, 9 and 12 o'clock positions around its defining rib 23 so that each cell 22 is connected in a honeycomb to each other cell 22 positioned to its east, south, west, and north.

The mat 10 utilizes a military specification for neoprene that requires a tensile strength rating of 1800 to 2400 psi, and Shore A durometer ratings of 50 to 55; consequently, the mat 10 would attenuate a minimal amount of kinetic energy if impacted by any of the three ASTM F-355 impacting missiles (i.e. Procedure A, Procedure B, or Procedure C) and is therefore not intended for use as a shock attenuating surface for impacts to the surface by humans. The mat 10 is primarily intended to significantly attenuate the shock load of a VTOL aircraft, such as a helicopter, and serve as a munitions loading and handling surface, since it is designed for shock attenuation of impacting missiles having a larger impacting geometry, but having an exponentially greater mass than any of the impact missiles currently used in ASTM test F-355.

Figure 5A:
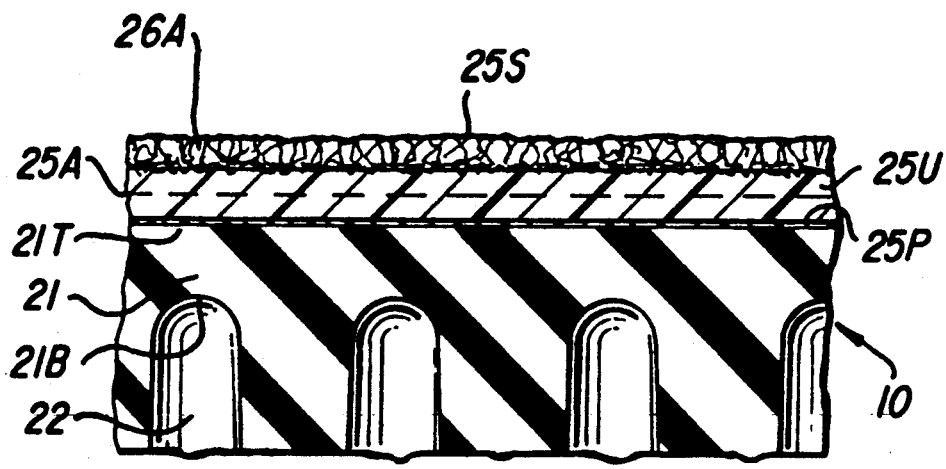
FIG. 5A is a partial cross-sectional view of a first embodiment of a top sealer and aggregate used in the present invention.
Figure 6A:
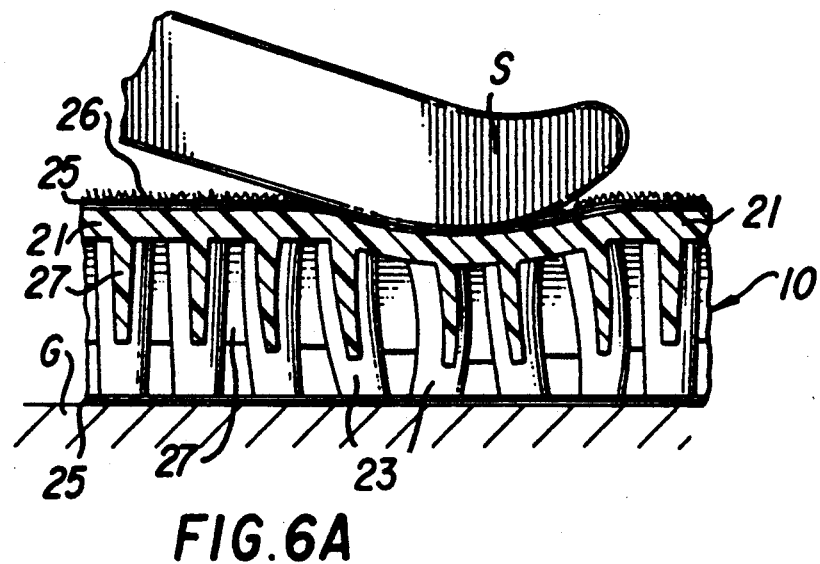
FIG. 6A is a cross-sectional view taken along line 4C-4C in FIG. 1 of the present invention.
Figure 6B:
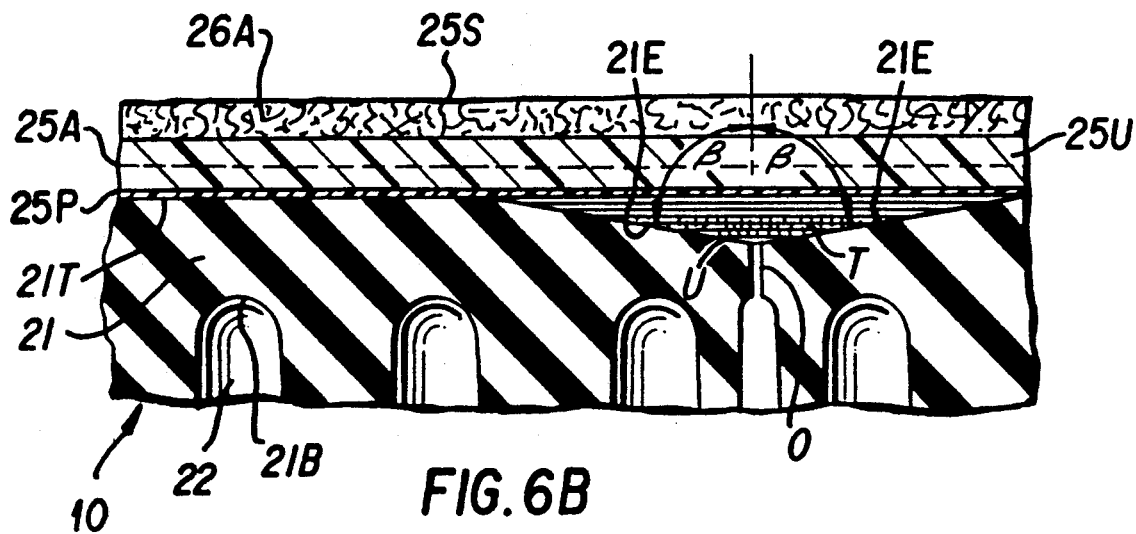
FIG. 6B is a partial cross-sectional view of a fourth embodiment of a top sealer and aggregate used in the present invention.
Figure 1:
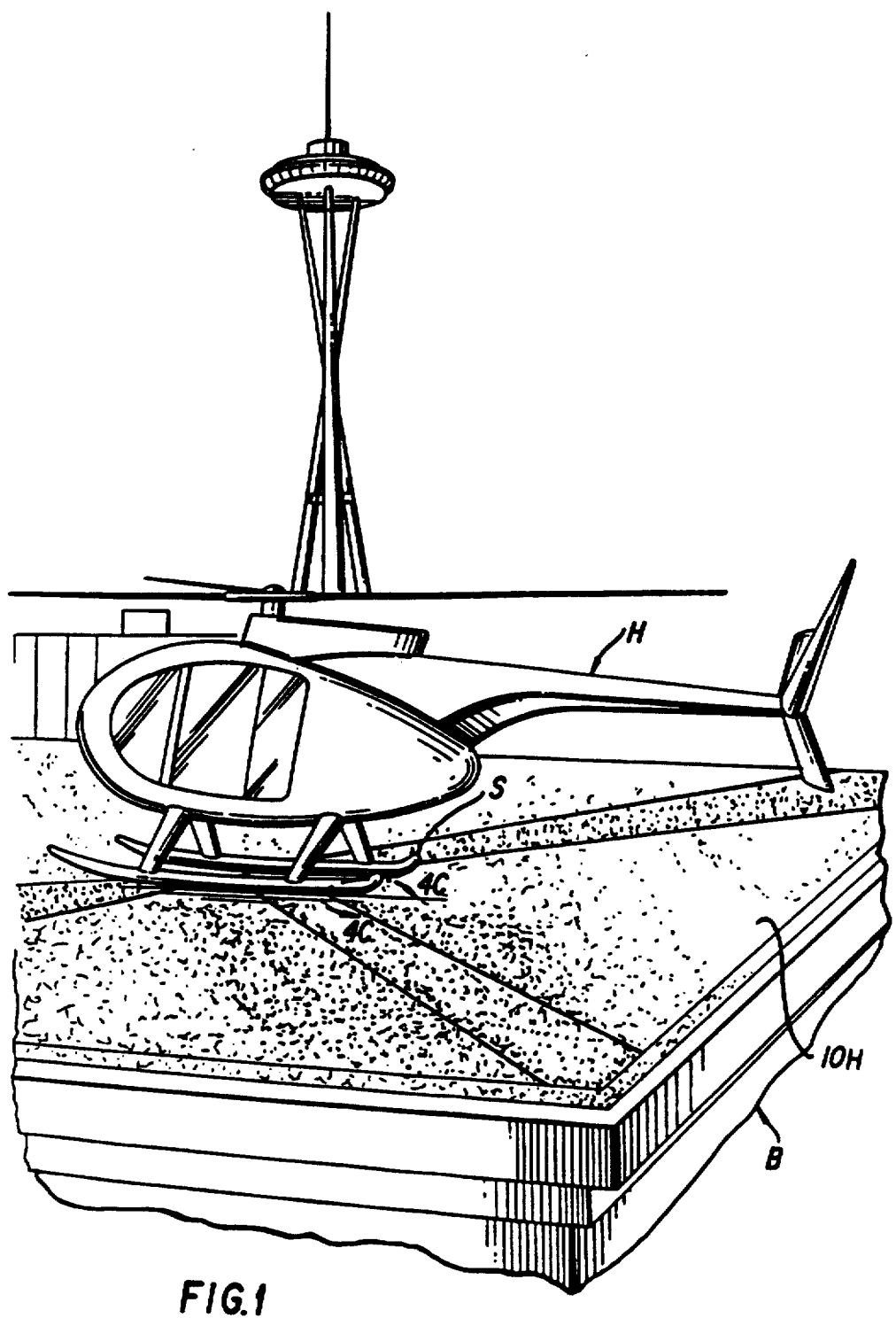
Figure 2:
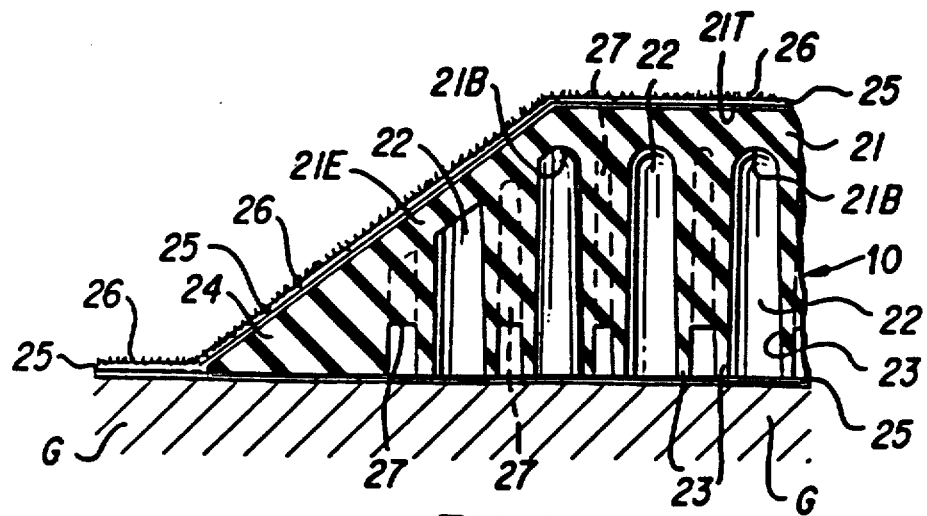
Figure 3:
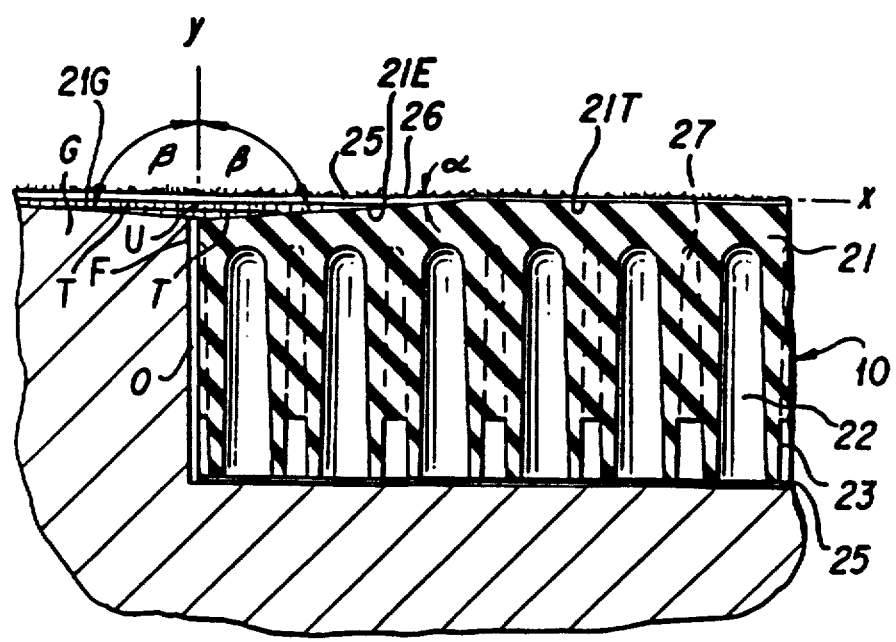
Figure 5A:
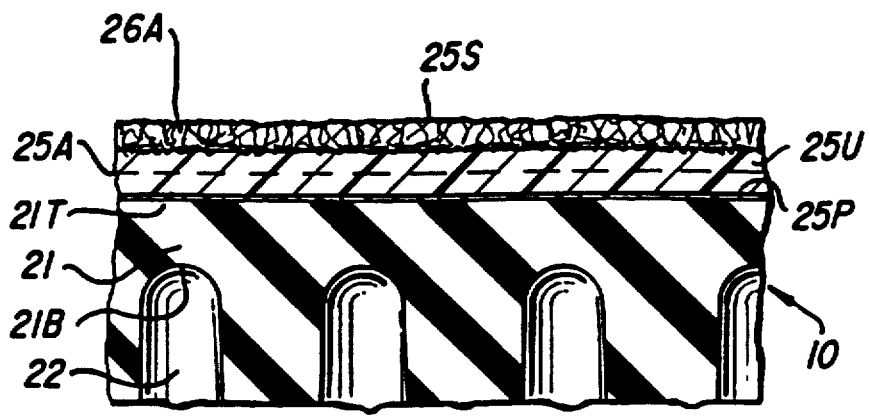
Figure 5B:
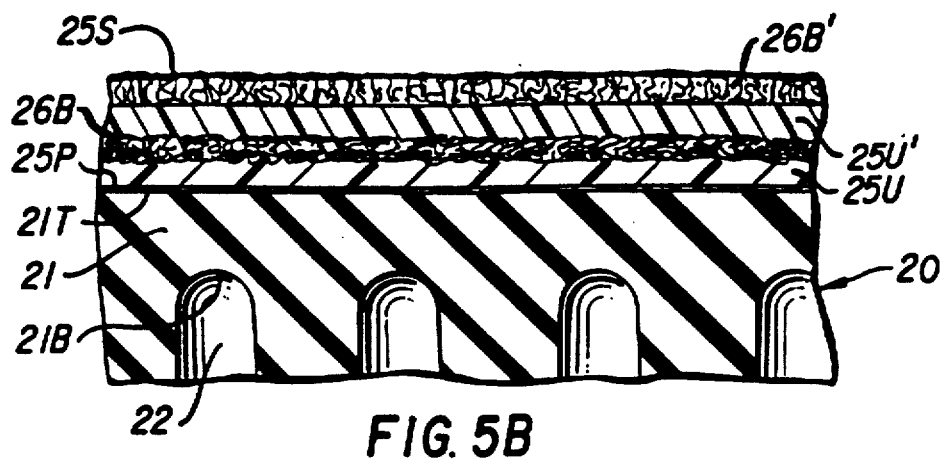
Figure 5C:
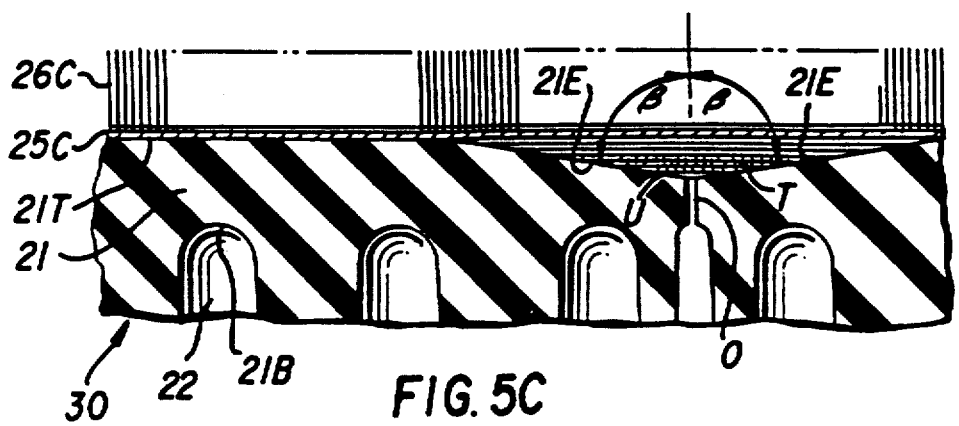
Figure 6A:
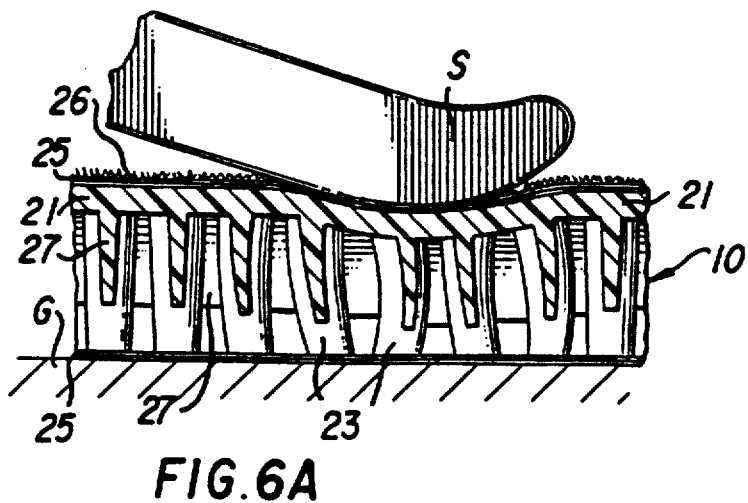
Figure 6B:
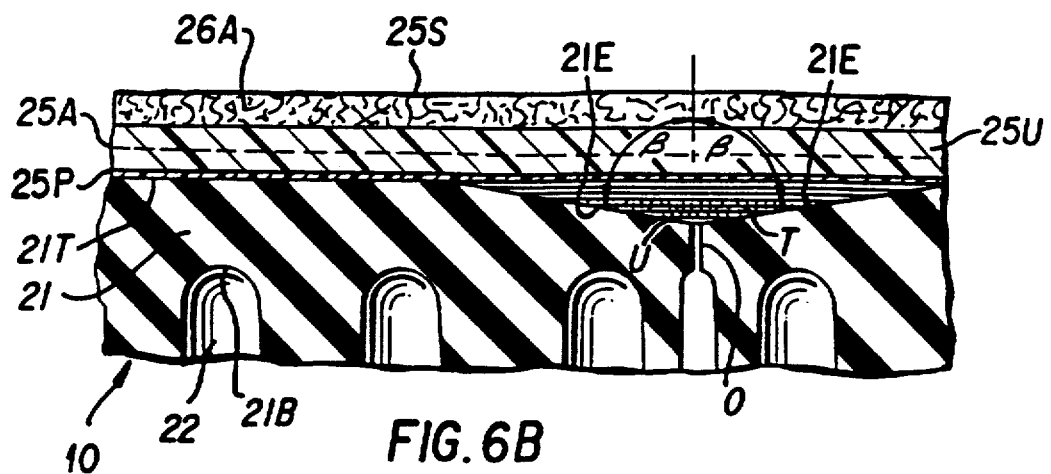

In FIGS. 5A and 6B, two embodiments of the sealer 25 and aggregate 26 of the present invention are shown. Each embodiment in FIGS. 5A and 6B is shown on the top 21T of the surface layer 21 with a plurality of air-filled cells 22 depending from the bottom 21B thereof.

In FIG. 5A, the mat 10 of the present invention is shown with a sealer 25A composed of a thin layer of a bottom urethane primer 25P and a top layer of a urethane 25U. The bottom primer 25P is used prior to the application of each top urethane 25U in order to strengthen the bond, thus preventing delamination of the top urethane 25U. The aggregate 26A is preferably a plurality of rubber granules broadcast into the top urethane 25U while still wet to the point of so-called "refusal". When the top urethane 25U has dried, the excess rubber granules of the aggregate 26A are removed and a urethane sealer 25S is applied over the textured surface, i.e. the top urethane 25U and the rubber granules comprising the aggregate 26A. Thus, in this first embodiment of sealer 25 and aggregate 26 of the present invention, the top urethane 25U is preferably a two-component urethane layer while the urethane sealer 25S is preferably a two-component urethane layer and the bottom primer 25P is also preferably a one-component urethane layer. Furthermore, an additional so-called "leveler" coat consisting of another top urethane 25U and another plurality of rubber granules 26A comprising another aggregate may be applied over the bottom primer 25P prior to application of the above-mentioned top urethane 25U in order to even out the irregularities that might protrude from the ground G and to further dissipate the kinetic energy of an impacting body.

Summarizing FIGS. 5A and 6B, the sealer 25 and the aggregate 26 cover the mats 10. A key function of the combined sealer 25 and aggregate 26 is to prevent any significant or rapid loss of attenuating properties due to weathering and/or exposure to ultraviolet radiation from the sun.

In FIG. 6A, there is illustrated a third embodiment of the shock attenuating mat 10 in which the skid S of the helicopter H is shown contacting the aggregate 26 and sealer 25 on top of the surface layer 21 of the mat 10. Because the sealer 25 that covers the surface layer 21 on top of the mat 10 also seals off the bottom of each air-filled cell 22, the air compresses within each cell 22, thus allowing for excellent shock attenuation on impact of the skid S. Also, it can be seen that the sealer 25 and the median ribs 27 hold the air-filled cells 22 in a honeycombed array in a substantively vertical position with respect to the ground G, further enhancing shock attenuating characteristics.

Referring to the embodiments of the present invention with mat 10 shown in FIGS. 1, 2, 3, 5A, 6A, and 6B, its function as a shock-attenuating vertical takeoff and landing zone may be described as follows:

first, to reduce substantially the shock load experienced by the helicopter H upon touchdown;

second, to attenuate rotor vibrations while the helicopter H is idling down or warming up;

third, to reduce substantially the level of noise present both inside and outside the helicopter H;

fourth, to provide a seamless takeoff and landing surface capable of withstanding the caustic properties of aviation fuels and related aircraft fluids;

fifth, to provide a surface capable of sufficiently attenuating the impact of tools, aircraft parts, and munitions in order to eliminate or at least reduce the possibility of damage, misfiring, and sparking;

sixth, to reduce substantially the costs of maintenance necessitated by damage caused by continual or severe accelerations to the helicopter H;

seventh, to increase substantially the reliability and safety of the helicopter H;

eighth, to provide a seamless surface system such that no significant amount of dirt, debris, water, nor contaminated air can be absorbed into and combined within the surface system to produce a toxic dust that may be inhaled by persons awaiting touchdown or by personnel aboard the aircraft;

ninth, to provide a seamless surface system such that when impact test data from laboratory and field tests are factored in with maintenance and human injury reports, the surface system is proven cost effective with respect to the helicopter and the personnel who fly and maintain it; and tenth, to provide a seamless surface system engineered and constructed such that it is possible to guarantee the installed product with a five-year warranty, and within the warranty include a clause stating that, after reconditioning of the surface system, the system can be guaranteed for an additional five-year period by a warranty identical in terms to the initial five-year warranty.

The foregoing preferred embodiments are considered illustrative only. Numerous other modifications will readily occur to those persons skilled in this particular technology after reading this specification. Consequently, the disclosed invention is not limited by the exact construction and operation shown and described above but rather is defined by the claims appended hereto.

What I claim as my invention is:

1. A surface system, for use on vertical takeoff and landing zones, for placement on a base, comprising:
    a surface layer having a bottom and outer edges;
    rib means, extending from the bottom of the surface layer, for defining an array of air-filled cells affixed to the bottom of the surface layer;
    a first layer of sealer means and aggregate means, spread over the surface layer, the outer edges, and the base immediate to the surface layer, for preventing loss of attenuating properties in the surface system due to weathering and exposure to ultraviolet solar radiation;
    median rib means, extending a shorter distance from the bottom of the surface layer than the defining rib means, for giving added support against a strong blow striking the surface layer and the array of air-filled cells affixed thereto; and
    a second layer of sealer means, spread under the array of air-filled cells and above the base, for preventing the escape of air therefrom upon impact thereto and also for holding the array of air-filled cells in a substantially vertical orientation with respect to the base.

2. The surface system, according to claim 1, wherein: said array of air-filled cells is a honeycomb.

3. The surface system, according to claim 1, wherein: said surface system is capable of being joined to an identical surface system.

4. A surface system, for use on vertical takeoff and landing zones, for placement on a base, comprising:
    a surface layer having a bottom and outer edges;
    rib means, extending from the bottom of the surface layer, for defining an array of air-filled cells affixed to the bottom of the surface layer;
    sealer and aggregate spread over the surface layer, the outer edges, and the base immediate to the surface layer;
    a plurality of median rib means, extending a shorter distance from the bottom of the surface layer than the defining rib means, for giving added support against a strong blow striking the surface layer and the array of air-filled cells affixed thereto; and
    at least one void area means, arranged in place of at least one of the plurality of median rib means, for facilitating cutting the surface system through the surface layer.

5. The surface system, according to claim 4, wherein: said void area means includes one void area provided through a middle of the array of air-filled cells lengthwise and a second void area provided through a middle of the array of air-filled cells widthwise.

6. The surface system, according to claim 4, wherein: said array of air-filled cells is a honeycomb.

7. The surface system, according to claim 4, wherein: said surface system is capable of being joined to an identical surface system.

8. A surface system, for use on vertical takeoff and landing zones, for placement on a base, comprising:
    a surface layer having a bottom and outer edges;
    rib means, extending from the bottom of the surface layer, for defining an array of air-filled cells affixed to the bottom of the surface layer;
    sealer and aggregate spread over the surface layer, the edges, and the base immediate to the outer surface layer;
    median rib means, extending a shorter distance from the bottom of the surface layer than the defining rib means, for giving added support against a strong blow striking the surface layer and the array of air-filled cells affixed thereto; and a sloping outer edge means, surrounding all sides of the surface layer, for helping to prevent tripping and for facilitating access by handicapped persons.

9. The surface system, according to claim 8, wherein:
said array of air-filled cells is a honeycomb.

10. The surface system, according to claim 8, wherein:
said surface system is capable of being joined to an identical surface system.

11. A surface system, for use on vertical takeoff and landing zones, for placement in a recess in a base, comprising:
a surface layer having a bottom and outer edges;
rib means, extending from the bottom of the surface layer, for defining an array of air-filled cells affixed to the bottom of the surface layer;
a first layer of sealer means and aggregate means, spread over the surface layer, the outer edges, and the base immediate to the surface layer, for preventing loss of attenuating properties in the surface system due to weathering and exposure to ultraviolet solar radiation;
median rib means, extending a shorter distance from the bottom of the surface layer than the defining rib means, for giving added support against a strong blow striking the surface layer and the array of air-filled cells affixed thereto;
a second layer of sealer means, spread under the array of air-filled cells and above the base, for preventing the escape of air therefrom upon impact thereto and also for holding the array of air-filled cells in a substantially vertical orientation with respect to the base; and
a beveled outer edge means, surrounding all sides of the surface layer, for facilitating attachment of the surface system to the base on at least one side of the surface system;
whereby the surface system placed in the recess in the base forms an integrated installation with the recess in the base.

12. The surface system, according to claim 11, wherein:
said array of air-filled cells is a honeycomb.

13. The surface system, according to claim 11, wherein:
said surface system is capable of being joined to an identical surface system.

14. The surface system, according to claim 11, further comprising:
tape means, secured to the beveled outer edge means and the base, for attaching the surface system flush with the base on at least one side of the surface system.

15. The surface system, according to claim 14, further comprising:
paste means, applied to the tape means, for facilitating attachment of the surface system flush with the base on at least one side of the surface system.

16. A surface system, for use on vertical takeoff and landing zones, for placement on a base, comprising:
a surface layer having a bottom and outer edges;
rib means, extending from the bottom of the surface layer, for defining an array of air-filled cells affixed to the bottom of the surface layer;
sealer and aggregate means, spread over the surface layer, the outer edge, and the base immediate to the surface layer, for preventing loss of attenuating properties in the surface system due to weathering and exposure to ultraviolet solar radiation;
a plurality of median rib means, extending a shorter distance from the bottom of the surface layer than the defining rib means, for giving added support against a strong blow striking the surface layer and the array of air-filled cells affixed thereto; and
at least one void area means, arranged in place of at least one of the plurality of median rib means, for facilitating cutting of the surface system through the surface layer.

17. The surface system, according to claim 16, wherein:
said void area means includes one void area provided through a middle of the array of air-filled cells lengthwise and a second void area provided through a middle of the array of air-filled cells widthwise.

18. The surface system, according to claim 16, wherein:
said array of air-filled cells is a honeycomb.

19. The surface system, according to claim 16, wherein:
said surface system is capable of being joined to an identical surface system.

20. A surface system, for use on vertical takeoff and landing zones, for placement on a base, comprising:
a surface layer having a bottom and outer edges;
rib means, extending from the bottom of the surface layer, for defining an array of air-filled cells affixed to the bottom of the surface layer;
sealer and aggregate spread over the surface layer, the outer edges, and the base immediate to the surface layer; and
a sloping outer edge means, surrounding all sides of the surface layer, for helping to prevent tripping and for facilitating access by handicapped persons.

21. The surface system, according to claim 20, wherein:
said array of air-filled cells is a honeycomb.

22. The surface system, according to claim 20, wherein:
said surface system is capable of being joined to an identical surface system.

23. A surface system, for use on vertical takeoff and landing zones, for placement on a base, comprising:
a surface layer having a bottom and outer edges;
rib means, extending from the bottom of the surface layer, for defining an array of air-filled cells affixed to the bottom of the surface layer;
a first layer of sealer and an aggregate spread over the surface layer, the outer edges, and the base immediate to the surface layer; and
a second layer of sealer spread under the array of air-filled cells and above the base, thus preventing the escape of air therefrom upon impact thereto and also holding the array of air-filled cells in a substantially vertical orientation with respect to the base.

24. The surface system, according to claim 23, wherein:
said array of air-filled cells is a honeycomb.

25. The surface system, according to claim 23, wherein:

said surface system is capable of being joined to an identical surface system.

26. A surface system, for use on vertical takeoff and landing zones, for placement in a recess in a base, comprising:
   a surface layer having a bottom and outer edges;
   rib means, extending from the bottom of the surface layer, for defining an array of air-filled cells affixed to the bottom of the surface layer;
   sealer and aggregate means, spread over the surface layer, the outer edges, and the base immediate to the surface layer, for preventing loss of attenuating properties in the surface system due to weathering and exposure to ultraviolet solar radiation;
   median rib means, extending a shorter distance from the bottom of the surface layer than the defining rib means, for giving added support against a strong blow striking the surface layer and the array of air-filled cells affixed thereto; and
   a beveled outer edge means, surrounding all sides of the surface layer, for facilitating attachment of surface system to the base on at least one side of the surface system;
   whereby the surface system placed in the recess in the base forms a first integrated installation with the recess in the base.

27. The surface system, according to claim 26, wherein:
   said array of air-filled cells is a honeycomb.

28. The surface system, according to claim 26, wherein:
   said surface system is capable of being joined to a second identical surface system on top of said surface system.

29. The surface system, according to claim 26, further comprising:
   tape means, secured to the beveled outer edge means and the base, for attaching the surface system flush with the base on at least one side of the surface system.

30. The surface system, according to claim 29, further comprising: paste means, applied to the tape means, for facilitating attachment of the surface system flush with the base on at least one side of the surface system.

31. A surface system, for use on vertical takeoff and landing zones, for placement on a base, comprising:
   a surface layer having a bottom and outer edges;
   rib means, extending from the bottom of the surface layer, for defining an array of air-filled cells affixed to the bottom of the surface layer; and
   sealer and aggregate means, spread over the surface layer, the outer edges, and the base immediate to the surface layer, for preventing loss of attenuating properties in the surface system due to weathering and exposure to ultraviolet solar radiation.

32. The surface system, according to claim 31, wherein:
   said array of air-filled cells is a honeycomb.

33. The surface system, according to claim 31, wherein:
   said surface system is capable of being joined to an identical surface system.

34. A surface system, for use on vertical takeoff and landing zones, for placement in a recess in a base, comprising:
   a surface layer having a bottom and outer edges;
   rib means, extending from the bottom of the surface layer, for defining an array of air-filled cells affixed to the bottom of the surface layer;
   sealer and aggregate means, spread over the surface layer, the outer edges, and the base immediate to the surface layer, for preventing loss of attenuating properties in the surface system due to weathering and exposure to ultraviolet solar radiation; and
   a beveled outer edge means, surrounding all sides of the surface layer, for facilitating attachment of the surface system to the base on at least one side of the surface system;
   whereby the surface system placed in the recess in the base forms an integrated installation with the recess in the base.

35. The surface system, according to claim 34, wherein:
   said array of air-filled cells is a honeycomb.

36. The surface system, according to claim 34, wherein:
   said surface system is capable of being joined to an identical surface system.

37. The surface, system, according the claim 34, further comprising:
   tape means, secured to the beveled outer edge means and the base, for attaching the surface system flush with the base on at least one side of the surface system.

38. The surface system, according to claim 37, further comprising:
   paste means, applied to the tape means, for facilitating attachment of the surface system flush with the base on at least one side of the surface system.

* * * * *

UNITED STATES PATENT AND TRADEMARK OFFICE
CERTIFICATE OF CORRECTION

PATENT NO. : 5,013,029

DATED : May 7, 1991

INVENTOR(S) : Thomas M. Vaux

It is certified that error appears in the above-identified patent and that said Letters Patent is hereby corrected as shown below:

Please delete the title page, drawings, and all columns and substitute therefor the following pages.

Signed and Sealed this

Twenty-first Day of June, 1994

Attest:

BRUCE LEHMAN

Attesting Officer — Commissioner of Patents and Trademarks

United States Patent [19]

Vaux

[11] Patent Number: 5,013,029

[45] Date of Patent: * May 7, 1991

[54] SHOCK-ATTENUATING SEAMLESS SURFACE SYSTEM FOR USE ON VERTICAL TAKEOFF AND LANDING ZONES

[76] Inventor: Thomas M. Vaux, 437 Tenth Ave. West, Kirkland, Wash. 98033

[*] Notice: The portion of the term of this patent subsequent to Feb. 12, 2008 has been disclaimed.

[21] Appl. No.: 377,415

[22] Filed: Jul. 10, 1989

Related U.S. Application Data

[63] Continuation-in-part of Ser. No. 152,817, Feb. 5, 1988, Pat. No. 4,846,457, which is a continuation-in-part of Ser. No. 767,718, Apr. 23, 1986, Pat. No. 4,727,697, which is a continuation of Ser. No. 364,811, Apr. 2, 1982, abandoned.

[51] Int. Cl.⁵ ............................................. A63G 71/02
[52] U.S. Cl. ................................. 272/3; 52/177; 404/32; 404/43
[58] Field of Search ............ 52/177; 5/443, 444, 5/448, 449, 465, 480, 481, 417–420; 272/3–5, 109; 273/193 A, 193 R; 404/32–37, 43

[56] References Cited

U.S. PATENT DOCUMENTS

| | | | |
|---|---|---|---|
| 957,387 | 5/1910 | Stedman | 404/32 |
| 2,920,846 | 1/1960 | Lingafelter | 244/114 |
| 2,999,431 | 9/1961 | Mitchell | 404/32 |
| 3,251,076 | 5/1966 | Burke | 272/109 |
| 3,846,945 | 11/1974 | Roby | 52/177 |
| 4,557,475 | 12/1985 | Donovan | 272/3 |
| 4,572,700 | 2/1986 | Mantarro et al. | 404/35 |

FOREIGN PATENT DOCUMENTS

| | | | |
|---|---|---|---|
| 58825 | 9/1982 | European Pat. Off. | 272/3 |
| 92837 | 11/1983 | European Pat. Off. | 272/3 |

Primary Examiner—Richard E. Chilcot, Jr.
Attorney, Agent, or Firm—Joseph Scafetta, Jr.

[57] ABSTRACT

Shock-attenuating seamless surface systems, for use on vertical takeoff and landing zones, can be installed on a base or installed in a recess in the base such that an integrated installation is obtained.

All systems have a surface layer with a bottom and outer edges; ribs extending from the bottom of the surface layer for defining an array of air-filled cells affixed to the bottom of the surface layer; and a first layer of sealer and aggregate spread over the surface layer, the outer edges, and the base immediate to the surface system.

More complex systems may include one or more of the following: a plurality of median ribs extending a shorter distance from the bottom of the surface layer than the defining ribs in order to enhance and make consistent attenuating characteristics upon impact to the surface layer, to allow internal venting, and facilitate conformity to the base; a void area left in place of at least one median rib in order to facilitate cutting through the surface layer; a second layer of sealer spread under the array of air-filled cells and above the base in order to prevent the escape of air therefrom upon impact thereto and hold the cells in a vertical orientation with respect to the base; a sloping outer edge surrounding all sides to help prevent tripping and facilitate access by handicapped persons; and a beveled outer edge surrounding all sides for facilitating attachment to an identical system or the base.

38 Claims, 5 Drawing Sheets

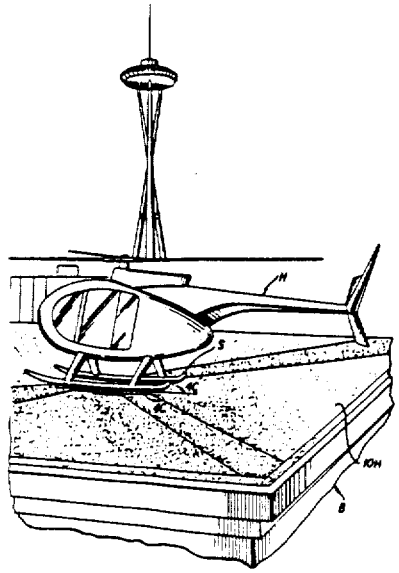

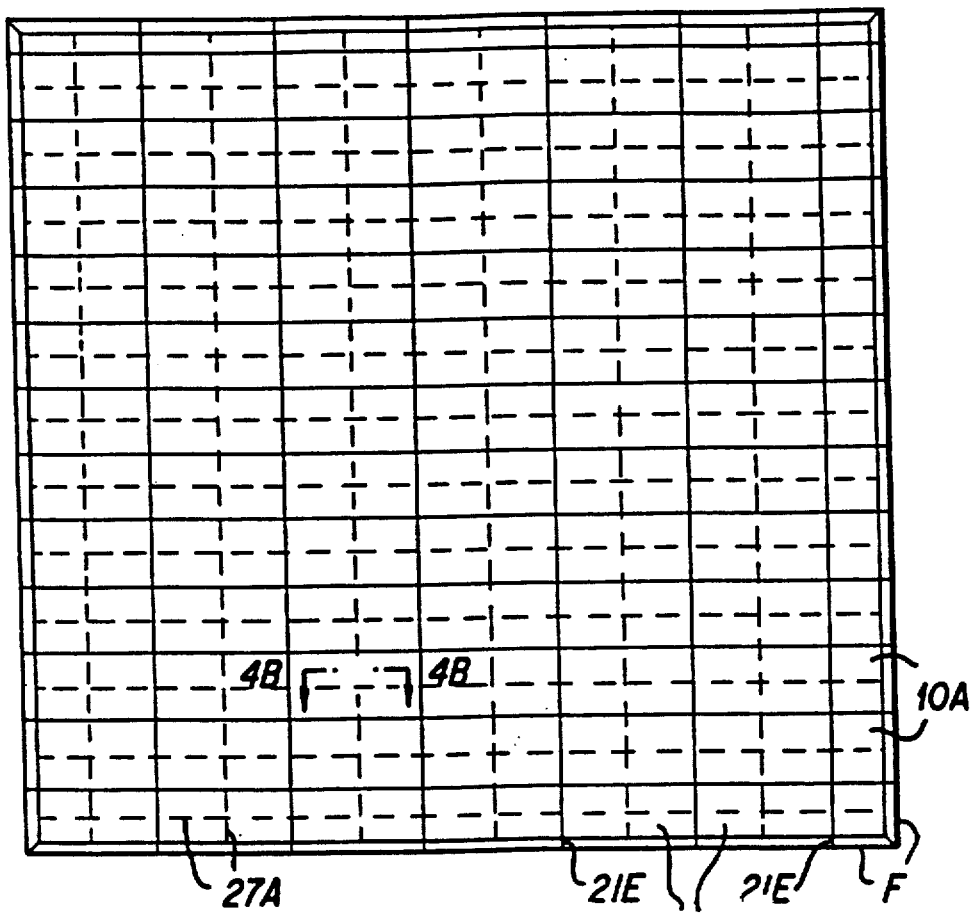
FIG. 4A
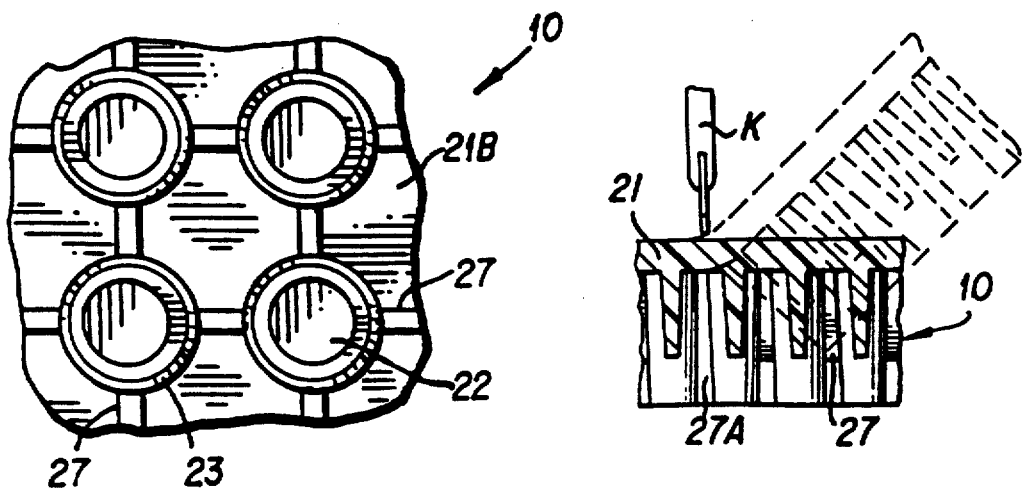
FIG. 4C
FIG. 4B

SHOCK-ATTENUATING SEAMLESS SURFACE SYSTEM FOR USE ON VERTICAL TAKEOFF AND LANDING ZONES

CROSS-REFERENCE TO RELATED APPLICATIONS

This application is a continuation-in-part of application Ser. No. 07/152,817, filed Feb. 5, 1988, now issued as U.S. Pat. No. 4,846,457 on July 11, 1989, which is a continuation-in-part (CIP) of U.S. patent application Ser. No. 06/767,718, filed Apr. 23, 1986, now issued as U.S. Pat. No. 4,727,697 on Mar. 1, 1988, which is a continuation of U.S. patent application Ser. No. 06/364,811, filed Apr. 2, 1982, now abandoned.

BACKGROUND OF THE INVENTION

1. Field of the Invention

The present invention relates generally to static structures, particularly traffic-carrying surfaces, such as helicopter landing pads.

2. Description of the Related Art

Helipads used for both civilian and military applications have usually consisted of an asphalt or concrete substrate that is coated with urethanes of various colors to form a predetermined pattern. The urethane coatings are generally applied just 8 mils (8/1000 of an inch=0.203 millimeters) thick; consequently, they provide no significant benefit other than clearly marking a landing zone.

With a desire for a more permanent and consistent surface, nonloose fill surfaces in the nature of processed particles bonded together in some fashion were developed to be installed over hard surfaces, such as concrete and asphalt. Nonloose fill surfaces, which are generally referred to as synthetics, can be divided into two main categories: systems with seams and systems without seams. Examples of systems with seams or so-called nonseamless systems are shown in U.S. Pat. No. 4,557,475 to Donovan, U.S. Pat. No. 3,846,945 to Roby, U.S. Pat. No. 3,251,076 to Burke, U.S. Pat. No. 2,999,431 to Mitchell, and U.S. Pat. No. 957,387 to Stedman.

Both nonseamless and seamless surface systems have an attenuating element and a surface layer. This surface layer can be either installed in the field or integrated at the time of manufacture. However, the seamless systems have a texture coat of sealer and aggregate applied over the surface layer to form a monolithic arrangement.

Seamless surface systems are becoming the more desirable of the synthetic systems because insects and rodents cannot enter and nest in them, nor can dirt and debris collect or lodge in any seams. Also, properly designed and installed seamless systems do not absorb toxins associated with debris or contaminated air.

An additional benefit of seamless surface systems is that water is not allowed to enter into the system. Water, when introduced into the system, can cause structural deterioration, and delamination of the surface system from its subbase, and can cause the seamless surface system to freeze much more quickly and intensely in conditions below 0.0 degrees Celsius.

SUMMARY OF THE INVENTION

A seamless protective surface system for vertical takeoff and landing aircraft (VTOL), such as helicopters, comprises an integrated helipad which will significantly attenuate the forces associated with the shock load that the aircraft experiences on touchdown. The protective surface system will significantly attenuate the accelerations experienced by the helicopter as it is warming up, idling, or idling down; and the protective surface system makes an excellent surface for handling and loading munitions, since it reduces the risk of accidental detonation or damage to the munitions in the case of material mishandling. The protective surface system will not allow direct entry, absorption, or retention of any significant amount of solids, liquids, or contaminated air that come in contact with the surface system, nor any toxins associated with those solids, liquids, and contaminated air.

Helicopter pilots generally attempt to stabilize the aircraft at a height of four to ten feet above the ground, and orient the helicopter at a particular angle to the landing zone. The helicopter's landing orientation (height and angle to the ground) during stabilization is determined by various factors, such as wind speed, conditions of rain or snow, and necessity to land. In optimum conditions, the helicopter pilot should be able to correctly orient and stabilize the aircraft prior to landing; however, due to mechanical failure, pilot error, or inclement weather, the helicopter can be brought down at an incorrect angle to the ground, or brought down so quickly that the shock load on impact exceeds substantially the shock attenuating capabilities, if available, of the helicopter's landing gear (i.e. skids or pneumatic tires) and suspension system.

Thus, it is an object of the present invention to provide a seamless surface system for use as a helipad that will attenuate a significant shock load in case of failure of the aircraft's landing gear and suspension system, due to mechanical failure, pilot error, or conditions of inclement weather.

In the case of a helicopter landing at an incorrect angle to the ground, the aircraft may gyrate in such a manner that the helicopter tips over, and consequently its rotor blades or other mechanical parts strike the ground producing sparks. If aviation fuel has spilled from the fuel tanks, the sparks from the rotor blades or other mechanical parts may ignite a fire. A fire of this type and intensity would put the aircraft and the personnel aboard in extreme danger.

Thus, it is also an object of this invention to provide a seamless surface system for use as a helipad that will attenuate a blow to the surface from the rotor blades or another mechanical part, such that the possibility of sparks resulting from the blow to the surface will be greatly reduced or eliminated.

A helicopter, when warming up, idling, or idling down, accelerates significantly with respect to the ground (i.e. asphalt, concrete, or 8 mils of urethane over concrete or asphalt). The accelerations that the helicopter experiences generally result in increased maintenance costs and a shorter product life span. If the damage resulting from accelerations to the helicopter at certain frequencies, while idling, is not repaired, then the VTOL aircraft would have a predisposition to mechanical failure while in flight. The noise created by the helicopter's accelerations can cause loss of hearing, fatigue, irritability, and disorientation to the persons aboard the aircraft.

Therefore, another important objective of the present invention is to provide a seamless surface system that will substantially reduce the accelerations of the helicopter when warming up, idling, or idling down.

Traffic-carrying surfaces for areas where munitions are handled have generally been metallic or concrete because heavy equipment, such as motorized carts and utility vehicles for moving materials, were required to pass over them. Although metal and concrete make good transportation surfaces and are easy to clean, they provide no attenuating protection for munitions, mechanical tools, or mechanical parts that may be dropped.

Thus, it is an object of the present invention to provide a seamless surface system for use under munitions handling areas, and areas where mechanical tools and parts are handled. This system will substantially protect against damage arising from the accidental dropping or mishandling of munitions, mechanical tools, and mechanical parts. This surface system will also support passage of motorized carts and utility vehicles that are equipped with pneumatic tires.

Seamless surface systems vary in structural design, and the quality and compatibility of their component parts. If a seamless surface system is improperly engineered or utilizes incompatible component parts, the shrinking, cracking, delamination, and structural deterioration that occur as a result of exposure to the sun's ultra-violet rays will permit entry and retention of water, dirt, debris, and toxins from contaminated air. As the VTOL aircraft is landing, a toxic dust that forms by combining solids, liquids, and toxins within the surface system is uplifted, then blown towards, and finally inhaled by both the persons awaiting the touchdown of the helicopter, and later by the personnel exiting the aircraft.

It is an object of the present invention to provide a properly engineered seamless surface system comprised of compatible component parts of appropriate quality, such that when subjected to all types of atmospheric conditions, the surface system will not allow any significant entry or retention of water, dirt, debris, or toxins from polluted air.

Laboratory and field tests that measure the shock attenuating properties of the seamless surface system will have to be developed or adapted from existing standardized test methodologies. The laboratory tests would require placing instruments, such as the RISK dummies used by NHTSA for automobile crash testing, and mounting accelerometers at significant stress points within the VTOL aircraft. Impact testing would be performed at various impact velocities and angles to the ground. The data obtained from the laboratory impact testing will determine the exact structural design and installation techniques to produce an optimal seamless surface system. The field testing would consist of using portable versions of the laboratory test methodologies, and testing the surface system at specific intervals of time, within a predetermined product life span of five to ten years. Field test data combined with maintenance and injury records of several installed surface systems, each in a substantially different atmospheric environment (e.g. Seattle, Wash.; Los Angeles, Calif.), will generate the data necessary to substantiate the cost effectiveness of the surface systems with respect to the following: reduced maintenance costs, extended life span, and reduction in both incidence and severity of injuries to the personnel aboard the aircraft and those who maintain it.

Thus, it is an extremely important object of the present invention to provide a seamless surface system such that, when impact tested in the laboratory, the data generated is reproducible in the field; and, when the laboratory and field test data are factored in with aircraft maintenance and human injury records, the cost effectiveness of the seamless surface system is justifiable.

How these objects and other advantages of the present invention are obtained will become more readily understood from the following brief description of the drawings and the subsequent detailed description of the preferred embodiments.

BRIEF DESCRIPTION OF THE DRAWINGS

FIG. 1 is a perspective view of a helicopter on a helipad of the present invention.

FIG. 2 is a cross-sectional view of a mat of the present invention installed on the ground.

FIG. 3 is a cross-sectional view of a mat of the present invention recessed in the ground.

FIG. 4A is a top plan view of a plurality of contiguous mats of the present invention.

FIG. 4B is a cross-sectional view taken along line 4B—4B in FIG. 4A of the present invention.

FIG. 4C is a bottom plan view of a mat of the present invention.

FIG. 5A is a partial cross-sectional view of a first embodiment of a top sealer and aggregate used in the present invention.

Figure 5B:
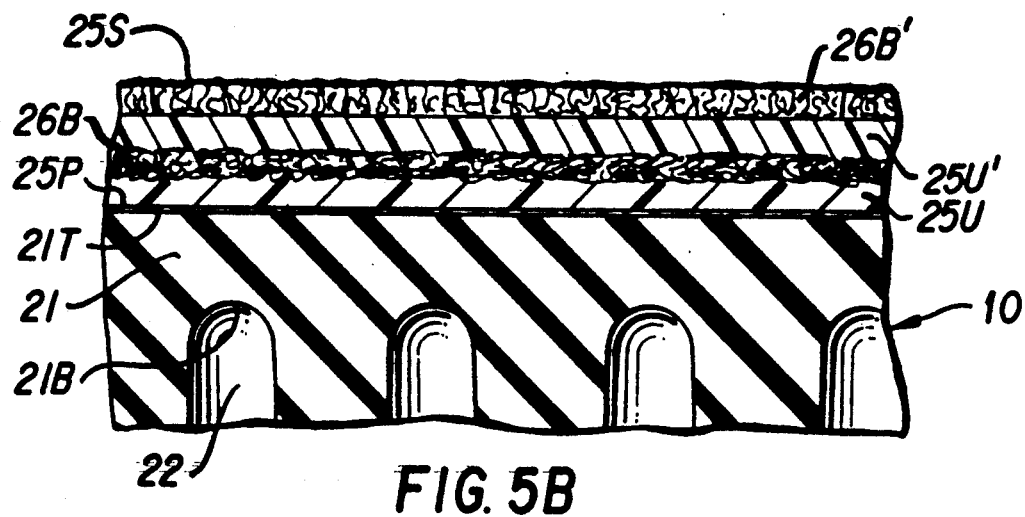
FIG. 5B is a partial cross-sectional view of a second embodiment of a top sealer and aggregate used in the present invention.

FIG. 5B is a partial cross-sectional view of a second embodiment of the top sealer and aggregate.

Figure 5C:
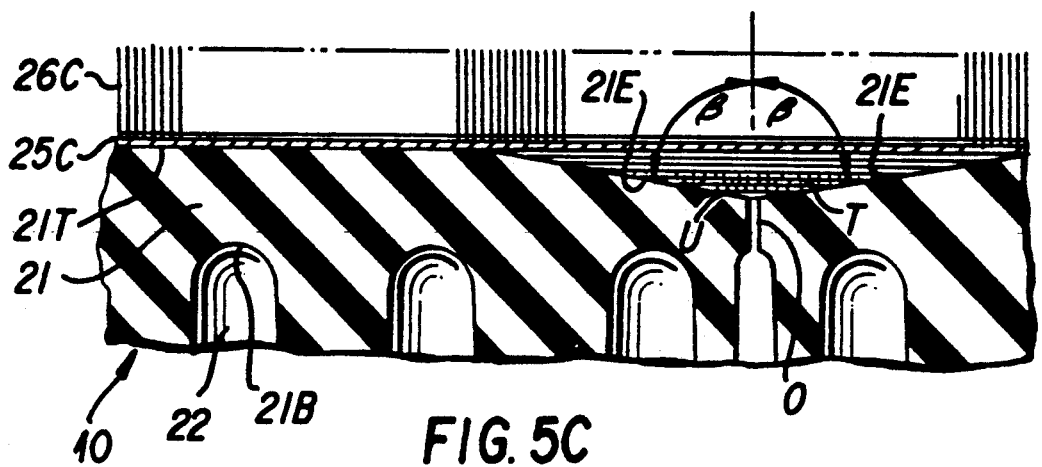
FIG. 5C is a partial cross-sectional view of a third embodiment of a top sealer and synthetic turf used in the present invention.

FIG. 5C is a partial cross-sectional view of a third embodiment of the top sealer and synthetic turf.

FIG. 6A is a cross-sectional view taken along line 4C—4C in FIG. 1 of the present invention.

FIG. 6B is a partial cross-sectional view of a fourth embodiment of the top sealer and aggregate.

DETAILED DESCRIPTION OF THE PREFERRED EMBODIMENTS

In FIG. 1, a first embodiment of the present invention shows a helicopter H with skids S resting on a helipad 10H which has been installed on top of a building B.

In FIG. 2, a second embodiment of the present invention shows an impact-absorbing safety mat 10 placed on the ground G which may be an asphalt or concrete base. The mat 10 has a surface layer 21 with a bottom 21B and a beveled outer edge 21E. A honeycombed array of air-filled cells 22 depend from the bottom 21B of the surface layer 21. Ribs 23 extend from the bottom 21B of the surface layer 21 and define the honeycombed array of air-filled cells 22. A sloping outer edge 24 surrounds all sides of the mat 10, which helps to prevent tripping and facilitates access for the handicapped. The sealer 25 and the aggregate 26 are spread over a top 21T of the surface layer 21, the sloping outer edge 24, and the ground G immediately adjacent to the mat 10, so that the sealer 25 prevents the sloping outer edge 24 from lifting up and warping, thus maintaining the integrity of the installed system. A second layer of the sealer 25 is also spread under the array of air-filled cells 22 so that both air and moisture are prevented from entering into and escaping from the air-filled cells 22. This second bottom layer of the sealer 25 also helps to hold the array of air-filled cells 22 in a substantially vertical orientation with respect to the ground G. Median ribs 27 extend a shorter distance from the bottom 21B of the surface layer 21 than the defining ribs 23 and give added support to the surface layer 21 against a strong blow striking the array of air-filled cells 22.

In FIG. 3, a third embodiment of the present invention shows an impact-absorbing safety mat 10 recessed in the ground G which again may be a concrete or asphalt base. The structure of the third embodiment is identical to the structure of the second embodiment described in FIG. 2 except that the third embodiment omits the sloping outer edge 24. Also, the surface layer 21 has a modified outer edge 21E which is a bevel or chamfer. A bevel is defined by Webster's New Collegiate Dictionary (1981) at page 105 as "the angle that one surface or line makes with another when they are not at right angles". In this third embodiment, the preferred gradation of an angle $\beta$ (beta) formed between the vertical y-axis extending along a face of the recess in the ground G and the beveled outer edge 21E is 83.75°. This angle $\beta$ is made by extending the outer edge 21E back two inches along the x-axis and dropping the outer edge 21E down one-eighth inch along the y-axis so that the angle $\beta$ has a 16:1 ratio or a complementary angle $\alpha$ (alpha) of 6.25°. An opening O left between the beveled outer edge 21E and a beveled outer edge 21G, which is immediately adjacent the face F of the recess in the ground G, is covered over with a fiberglass mesh tape T which is, in turn, penetrated by a urethane paste U comprised of urethane and fine mesh rubber granules that enter holes in the tape T, thus encapsulating the tape T. The urethane paste U is built up until it fills the bevel or chamfer forming the angles $\beta$ between adjacent beveled outer edges 21E and 21G, so that the tape T and the urethane paste U secure the mat 10 to the ground G. The top of the urethane paste U, which encapsulates the tape T, and the top 21T of the surface layer 21 are now flush with the ground G. Then the top 21T of the surface layer 21, the top of the urethane paste U, which encapsulates tape T, and the ground G, which is immediately adjacent the urethane paste U, are covered over by the sealer 25 and the aggregate 26. Thus, the mat 10 becomes seamless with the ground G to form an integrated installation therewith. Additionally, by using slightly modified seaming techniques as those described with respect to FIG. 3 (i.e. spacing, taping, pasting), the mat 10 can become seamless and form an integrated installation with any structure that protrudes from the base, such as an electrical conduit, tubing for a plumbing installation, or support posts to which tie-down straps are hooked.

In FIG. 4A, a plurality of mats 10 are shown to be laid in a predetermined pattern. In this top view of FIG. 4A, the mats 10 are adjacent to each other. However, one layer of mats 10 may be placed on top of another layer in order to double the impact-absorbing ability of the integrated installation. The mats 10 are shown in FIG. 3 where the sealer 25 and the aggregate 26 are spread thereover. FIG. 4A also shows the beveled outer edges 21E in solid lines, along which each mat 10 is joined, in a manner to be described with regard to FIG. 6B, to an adjacent identical mat 10. For the sake of simplicity, the bevel or chamfer on all four outer edges 21E is not shown, but is illustrated only along the face F of the recess seen in FIG. 3. In FIG. 4A, each mat 10 is preferably four feet long and two feet wide, as can be seen by viewing the solid lines which are drawn in a pattern showing the length of each mat 10 to be twice the width. Each dashed line shown in FIG. 4A represents a void area 27A where a median rib 27 is omitted during the manufacture of each mat 10.

In FIG. 4B, the purpose of the void area 27A is shown to allow an installer to sever a selected mat 10 in half through the surface layer 21 with a cutting knife K so that each 2' by 4' mat may become either a 2' by 2' mat or a 1' by 4' mat, depending upon whether the cut is made through the middle thereof widthwise or lengthwise, respectively. The provision of void areas 27A in mat 10 is exemplified by returning briefly to FIG. 4A. In FIG. 4A along the right hand side thereof, it may be seen from the solid lines that a plurality of mats 10A have been cut as 2' by 2' mats by cutting 2' by 4' mats 10 widthwise. Thus, surface configurations having odd footage measurements may be covered by severing a mat lengthwise into two 1' by 4' sections.

In FIG. 4C, the underside of the surface layer 21 is shown with the bottoms of four selected adjacent air-filled cells 22. The cylindrical ribs 23 defining the array of air-filled cells 22 extend from the bottom of the surface layer 21 and have slight tapers. Each cell 22 has one median rib 27 at the so-called 3, 6, 9 and 12 o'clock positions around its defining rib 23 so that each cell 22 is connected in a honeycomb to each other cell 22 positioned to its east, south, west, and north. The median ribs 27 allow the mat 10 to conform easily to the contour of its base during installation. The median ribs 27 also facilitate internal venting in cases where moisture is somehow introduced into the surface system.

The mat 10 utilizes a military specification for neoprene that requires a tensile strength rating of 2700 psi, and a Shore A durometer rating of 60; consequently, the mat 10 would attenuate a minimal amount of kinetic energy if impacted by any of the three ASTM F-355 impacting missiles (i.e. Procedure A, Procedure B, or Procedure C) and is therefore not intended for use as a shock attenuating surface for impacts to the surface by humans. The mat 10 is primarily intended to attenuate significantly the shock load of a VTOL aircraft, such as a helicopter, and serve as a munitions loading and handling surface, since it is designed for shock attenuation of impacting missiles having a larger impacting geometry, but having an exponentially greater mass than any of the impact missiles currently used in the ASTM F-355 Test.

In FIGS. 5A and 6B, two embodiments of the sealer 25 and aggregate 26 of the present invention are shown. Each embodiment in FIGS. 5A and 6B is shown on the top 21T of the surface layer 21 with a plurality of air-filled cells 22 depending from the bottom 21B thereof.

In FIG. 5A, the mat 10 is shown with a sealer 25A composed of a thin layer of a bottom urethane primer 25P and a top layer of a urethane 25U. The bottom primer 25P is used prior to the application of each top urethane 25U in order to strengthen the bond, thus preventing delamination of the top urethane 25U. The aggregate 26A is preferably a plurality of rubber granules broadcast into the top urethane 25U while still wet to the point of so-called "refusal". When the top urethane 25U has dried, the excess rubber granules of the aggregate 26A are removed and a urethane sealer 25S is applied over the textured surface, i.e. the top urethane 25U and the rubber granules comprising the aggregate 26A. Thus, in this first embodiment of sealer 25 and aggregate 26 of the present invention, the top urethane 25U is preferably a two-component urethane layer while the urethane sealer 25S is also preferably a two-component urethane layer and the bottom primer 25P is preferably a one-component urethane layer. Furthermore, an additional so-called "leveler" coat consisting of another top urethane 25U and another plurality of rubber granules 26A comprising another aggregate may be applied over the bottom primer 25P prior to application of the above-mentioned top urethane 25U in order to even out the irregularities that might protrude from the ground G and to further dissipate the kinetic energy of an impacting body.

In FIG. 5B, the mat 20 is preferred for use under exercising equipment in playgrounds and other play areas for children. The so-called "leveler" coat is then applied to the mat 20 in several steps. First, a bottom primer 25P is applied over the top 21T of the surface layer 21. Then, a urethane 25U is applied over the bottom primer 25P. Rubber granules comprising an aggregate 26B are next broadcast into the "wet" urethane 25U to the point of refusal. When the urethane 25U has dried, the excess rubber granules comprising the aggregate 26B are removed. The above steps are repeated with a second urethane 25U' applied over the rubber granules comprising the aggregate 26B followed by a second plurality of rubber granules comprising another aggregate 26B' broadcast to the point of refusal into the urethane 25U'. When the second urethane 25U' has dried, the excess rubber granules comprising the aggregate 26B' are removed and a urethane sealer 25S is applied over the rubber granules making up the second aggregate 26B'. Thus, in this embodiment of the sealer 25 and the aggregate 26, the sealer 25 includes a two-component urethane (25U, 25U') and a urethane sealer 25S while the aggregate 26 includes two layers of rubber granules (26B, 26B'). The "leveler" coat (25U, and 26B) may be omitted if the ground G is not irregular enough to warrant its use, or if additional dissipation of the kinetic energy of an impacting body is not deemed necessary.

In FIG. 5C, the mat 30 is preferred for use on athletic fields and in arenas where different sports are played. In this embodiment of the sealer 25 and the aggregate 26, the sealer 25 is a one-part "mastic" 25C which is defined by Webster's Dictionary, supra, at page 702, as "any of various pasty materials used as protective coatings or cements." The "aggregate" is a conventional synthetic turf 26C bonded to the mat 30 by the mastic 25C. Although the turf 26C is not an "aggregate" in the traditional sense, the turf is considered an "aggregate" for purposes of definition in this particular embodiment.

Summarizing FIGS. 5A and 6B, the sealer 25 and the aggregate 26 cover the mats 10. A key function of the combined sealer 25 and aggregate 26 is to prevent any significant or rapid loss of attenuating properties due to weathering and/or exposure to ultraviolet radiation from the sun.

In FIG. 6A, there is illustrated an embodiment of the present invention in which the skid S of the helicopter H is shown contacting the aggregate 26 and sealer 25 on top of the surface layer 21 of the mat 10. Because the sealer 25 that covers the surface layer 21 on top of the mat 10 also seals off the bottom of each air-filled cell 22, the air compresses within each cell 22, thus allowing for excellent shock attenuation on impact of the skid S. Also, it can be seen that the sealer 25 and the median ribs 27 hold the air-filled cells 22 in a honeycombed array in a substantially vertical position with respect to the ground G, further enhancing shock attenuating characteristics.

Referring to the embodiments of the present invention with mat 10 shown in FIGS. 1, 2, 3, 5A, 6A, and 6B, the various functions as a shock-attenuating vertical takeoff and landing zone may be described as follows:

first, to reduce substantially the shock load experienced by the helicopter H upon touchdown;

second, to attenuate rotor vibrations while the helicopter H is idling down or warming up;

third, to reduce substantially the level of noise present both inside and outside the helicopter H;

fourth, to provide a seamless takeoff and landing surface capable of withstanding the caustic properties of aviation fuels and related aircraft fluids;

fifth, to provide a surface capable of sufficiently attenuating the impact of tools, aircraft parts, and munitions in order to eliminate or at least reduce the possibility of damage, misfiring, and sparking;

sixth, to provide a seamless surface system capable of supporting the passage of motorized carts and utility vehicles equipped with pneumatic tires;

seventh, to reduce substantially the costs of maintenance necessitated by damage caused by continual or severe accelerations to the helicopter H;

eighth, to increase substantially the reliability and safety of the helicopter H;

ninth, to provide a seamless surface system such that no significant amount of dirt, debris, water, nor contaminated air can be absorbed into and combined within the surface system to produce a toxic dust that may be inhaled by persons awaiting touchdown or by personnel aboard the aircraft;

tenth, to provide a seamless surface system such that, when impact test data from laboratory and field tests are factored in with maintenance and human injury reports, the surface system is proven cost effective; and eleventh, to provide a seamless surface system engineered and constructed such that it is possible to guarantee the installed product with a five-year warranty, and within the warranty include a clause stating that, after reconditioning of the surface system, the system can be guaranteed for an additional five-year period by a warranty identical in terms to the initial five-year warranty.

The foregoing preferred embodiments are considered illustrative only. Numerous other modifications will readily occur to those persons skilled in this particular technology after reading this specification. Consequently, the disclosed invention is not limited by the exact construction and operation shown and described above, but rather is defined by the claims appended hereto.

What I claim as my invention is as follows:

1. A surface system, for use on vertical takeoff and landing zones, for placement on a base, comprising:
   a surface layer having a bottom and outer edges;
   rib means, extending from the bottom of the surface layer, for defining an array of air-filled cells affixed to the bottom of the surface layer;
   sealer and aggregate, spread over the surface layer, the outer edges, and the base immediate to the surface system;
   median rib means, extending a shorter distance from the bottom of the surface layer than the defining rib means, for facilitating internal venting of the surface system; and
   a sloping outer edge means, for helping to prevent tripping and for facilitating access by handicapped persons.

2. The surface system, according to claim 1, wherein: said array of air-filled cells is a honeycomb.

3. The surface system, according to claim 1, wherein: said surface system is capable of being joined to an identical surface system.

4. A surface system, for use on vertical takeoff and landing zones, for placement on a base, comprising:
   a surface layer having a bottom and outer edges;
   rib means, extending from the bottom of the surface layer, for defining an array of air-filled cells affixed to the bottom of the surface layer;
   sealer and aggregate spread over the surface layer, the outer edges, and the base immediate to the surface system;
   a plurality of median rib means, extending a shorter distance from the bottom of the surface layer than the defining rib means, for facilitating conformity of the surface system to the contour of the base; and
   at least one void area means, arranged in place of at least one of the plurality of median rib means, for facilitating cutting of the surface system through the surface layer.

5. The surface system, according to claim 4, wherein: said void area means includes one void area provided through a middle of the array of air-filled cells lengthwise and a second void area provided through a middle of the array of air-filled cells widthwise.

6. The surface system, according to claim 4, wherein: said array of air-filled cells is a honeycomb.

7. The surface system, according to claim 4, wherein: said surface system is capable of being joined to an identical surface system.

8. A surface system, for use on vertical takeoff and landing zones, for placement on a base, comprising:
   a surface layer having a bottom and outer edges;
   rib means, extending from the bottom of the surface layer, for defining an array of air-filled cells affixed to the bottom of the surface layer;
   sealer and aggregate spread over the surface layer, the outer edges, and the base immediate to the surface system; and
   median ribs extending a shorter distance from the bottom of the surface layer than the defining rib means.

9. The surface system, according to claim 8, wherein: said array of air-filled cells is a honeycomb.

10. The surface system, according to claim 8, wherein: said surface system is capable of being joined to an identical surface system.

11. A surface system, for use on vertical takeoff and landing zones, for placement in a recess in a base, comprising:
    a surface layer having a bottom and outer edges;
    rib means, extending from the bottom of the surface layer, for defining an array of air-filled cells affixed to the bottom of the surface layer;
    a first layer of sealer means and aggregate means, spread over the surface layer, the outer edges, and the base immediate to the surface system, for preventing loss of attenuating properties in the surface system due to weathering and exposure to ultraviolet solar radiation;
    a second layer of sealer means, spread under the array of air-filled cells and above the base, for preventing the escape of air therefrom upon impact thereto and also for holding the array of air-filled cells in a substantially vertical orientation with respect to the base; and
    a beveled outer edge means, surrounding all sides of the surface system, for facilitating attachment of the surface system to any structure protruding from the base on at least one side of the surface system;
    whereby the surface system placed adjacent to the structure protruding from the base forms an integrated installation with the structure protruding from the base.

12. The surface system, according to claim 11, wherein: said array of air-filled cells is a honeycomb.

13. The surface system, according to claim 11, wherein: said surface system is capable of being joined to an identical surface system.

14. The surface system, according to claim 11, further comprising:
    tape means, secured to the beveled outer edge means and the structure protruding from the base, for attaching the structure protruding from the base flush with the surface system on at least one side of the surface system.

15. The surface system, according to claim 14, further comprising:
    paste means, applied to the tape means, for facilitating attachment of the structure protruding from the base flush with the surface system on at least one side of the surface system.

16. A surface system, for use on vertical takeoff and landing zones, for placement on a base, comprising:
    a surface layer having a bottom and outer edges;
    rib means, extending from the bottom of the surface layer, for defining an array of air-filled cells affixed to the bottom of the surface layer;
    sealer and aggregate spread over the surface layer, the outer edges, and the base immediate to the surface system;
    a plurality of median ribs extending a shorter distance from the bottom of the surface layer than the defining rib means; and
    at least one void area means, arranged in place of at least one of the plurality of median ribs, for facilitating cutting of the surface system through the surface layer.

17. The surface system, according to claim 16, wherein: said void area means includes one void area provided through a middle of the array of air-filled cells lengthwise and a second void area provided through a middle of the array of air-filled cells widthwise.

18. The surface system, according to claim 16, wherein: said array of air-filled cells is a honeycomb.

19. The surface system, according to claim 16, wherein: said surface system is capable of being joined to an identical surface system.

20. A surface system, for use on vertical takeoff and landing zones, for placement on a base, comprising:
    a surface layer having a bottom and outer edges;
    rib means, extending from the bottom of the surface layer, for defining an array of air-filled cells affixed to the bottom of the surface layer;

sealer and aggregate spread over the surface layer, the outer edges, and the base immediate to the surface system; and a sloping outer edge surrounding all sides of the surface system.

21. The surface system, according to claim 20, wherein:
said array of air-filled cells is a honeycomb.

22. The surface system, according to claim 20, wherein:
said surface system is capable of being joined to an identical surface system.

23. A surface system, for use on vertical takeoff and landing zones, for placement on a base, comprising:
a surface layer having a bottom and outer edges;
rib means, extending from the bottom of the surface layer, for defining an array of air-filled cells affixed to the bottom of the surface layer;
a first layer of sealer and an aggregate spread over the surface layer, the outer edges, and the base immediate to the surface layer; and
a second layer of sealer spread under the array of air-filled cells and above the base, thus preventing the escape of air therefrom upon impact thereto and also holding the array of air-filled cells in a substantially vertical orientation with respect to the base.

24. The surface system, according to claim 23, wherein:
said array of air-filled cells is a honeycomb.

25. The surface system, according to claim 23, wherein:
said surface system is capable of being joined to an identical surface system.

26. A surface system, for use on vertical takeoff and landing zones, for placement on a base, comprising:
a surface layer having a bottom and outer edges;
rib means, extending from the bottom of the surface layer, for defining an array of air-filled cells affixed to the bottom of the surface layer;
sealer and aggregate means, spread over the surface layer, the outer edges, and the base immediate to the surface system, for preventing loss of attenuating properties in the surface system due to weathering and exposure to ultraviolet solar radiation;
median rib means, extending a shorter distance from the bottom of the surface layer than the defining rib means, for giving added support against a strong blow striking the surface layer and the array of air-filled cells affixed thereto; and
a beveled outer edge means, surrounding all sides of the surface layer, for facilitating attachment of surface system to a first identical surface system on at least one side of the surface system.

27. The surface system, according to claim 26, wherein:
said array of air-filled cells is a honeycomb.

28. The surface system, according to claim 26, wherein:
said surface system is capable of being joined to a second identical surface system on top of said surface system.

29. The surface system, according to claim 26, further comprising:
tape means, secured to the beveled outer edge means and the first identical surface system, for attaching the surface system flush with the first identical surface system on at least one side of the surface system.

30. The surface system, according to claim 29, further comprising:
paste means, applied to the tape means, for facilitating attachment of the surface system flush with the first identical surface system on at least one side of the surface system.

31. A surface system, for use on vertical takeoff and landing zones, for placement on a base, comprising:
a surface layer having a bottom and outer edges;
rib means, extending from the bottom of the surface layer, for defining an array of air-filled cells affixed to the bottom of the surface layer; and
sealer and aggregate means, spread over the surface layer, the outer edges, and the base immediate to the surface system, for preventing loss of attenuating properties in the surface system due to weathering and exposure to ultraviolet solar radiation.

32. The surface system, according to claim 31, wherein:
said array of air-filled cells is a honeycomb.

33. The surface system, according to claim 31, wherein:
said surface system is capable of being joined to an identical surface system.

34. A surface system, for use on vertical takeoff and landing zones, for placement in a recess in a base, comprising:
a surface layer having a bottom and outer edges;
rib means, extending from the bottom of the surface layer, for defining an array of air-filled cells affixed to the bottom of the surface layer;
sealer and aggregate spread over the surface layer, the outer edges, and the base immediate to the surface system; and
a beveled outer edge means, surrounding all sides of the surface system, for facilitating attachment of the surface system to the base on at least one side of the surface system;
whereby the surface system placed in the recess in the base forms an integrated installation with the recess in the base.

35. The surface system, according to claim 34, wherein:
said array of air-filled cells is a honeycomb.

36. The surface system, according to claim 34, wherein:
said surface system is capable of being joined to an identical surface system.

37. The surface, system, according the claim 34, further comprising:
tape means, secured to the beveled outer edge means and the base, for attaching the surface system flush with the base on at least one side of the surface system.

38. The surface system, according to claim 37, further comprising:
paste means, applied to the tape means, for facilitating attachment of the surface system flush with the base on at least one side of the surface system.

* * * * *